(12) United States Patent
Lu et al.

(10) Patent No.: US 11,496,044 B2
(45) Date of Patent: *Nov. 8, 2022

(54) DC/DC CONVERTER AND NEUTRAL-POINT VOLTAGE BALANCE CONTROL METHOD THEREOF

(71) Applicant: Delta Electronics (Shanghai) Co., Ltd., Shanghai (CN)

(72) Inventors: Cheng Lu, Shanghai (CN); Wenfei Hu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,243

(22) Filed: Jan. 6, 2021

(65) Prior Publication Data

US 2021/0226534 A1 Jul. 22, 2021

(30) Foreign Application Priority Data

Jan. 16, 2020 (CN) .......................... 202010049402.6

(51) Int. Cl.
*H02M 3/335* (2006.01)
*H02M 3/00* (2006.01)
(Continued)

(52) U.S. Cl.
CPC ......... *H02M 3/01* (2021.05); *H02M 3/33584* (2013.01); *H02M 7/4833* (2021.05); *H02M 7/487* (2013.01)

(58) Field of Classification Search
CPC . H02M 3/335–42; H02M 3/01; H02M 1/0095
See application file for complete search history.

(56) References Cited

U.S. PATENT DOCUMENTS

2017/0063251 A1* 3/2017 Ye ..................... H02M 3/33576
2018/0097453 A1 4/2018 Xu et al.
(Continued)

FOREIGN PATENT DOCUMENTS

CN 101018017 A 8/2007
CN 105247775 A * 1/2016 .......... H02M 3/1582
(Continued)

OTHER PUBLICATIONS

Li Wuhua et al., "Flying-Capacitor-Based Hybrid LLC Converters With Input Voltage Autobalance Ability for High Voltage Applications", in IEEE Transactions on Power Electronics, vol. 31, No. 3, pp. 1908-1920, Mar. 2016.
(Continued)

*Primary Examiner* — Peter M Novak
(74) *Attorney, Agent, or Firm* — CKC & Partners Co., LLC

(57) ABSTRACT

The present disclosure provides a control method of a DC/DC converter and a related DC/DC converter. The control method allows for: detecting a difference between a first voltage and a second voltage; if an absolute value of the difference between the first voltage and the second voltage is greater than or equal to a preset value, reselecting desired operating states of respective switches in a 1-level state according to the difference between the first voltage and the second voltage and a direction of an average current from a fourth node to a first passive network in the 1-level state; and thus outputting a control signal to enable the voltage difference between the first capacitor and the second capacitor to
(Continued)

be reduced, thereby effectively adjusting the neutral-point voltage balance of the DC/DC converter.

22 Claims, 15 Drawing Sheets

(51) Int. Cl.
*H02M 7/483* (2007.01)
*H02M 7/487* (2007.01)

(56) References Cited

U.S. PATENT DOCUMENTS

2018/0337610 A1  11/2018  Leong et al.
2019/0222116 A1  7/2019  Manthe et al.

FOREIGN PATENT DOCUMENTS

| CN | 105247775 A | 1/2016 |
| CN | 109889050 A | 6/2019 |
| CN | 110768237 A | 2/2020 |

OTHER PUBLICATIONS

Yu Xiaoyang et al., "Capacitor Voltage Control Strategy for Half-Bridge Three-Level DC/DC Converter," in IEEE Transactions on Power Electronics, vol. 29, No. 4, pp. 1557-1561, Apr. 2014.

Jiao Yang et al., "Topology Evaluation and Comparison for Isolated Multilevel DC/DC Converter for Power Cell in Solid State Transformer," 2019 IEEE Applied Power Electronics Conference and Exposition (APEC), 2019, pp. 802-809.

Liu Wei et al., "An Interleaved PWM Method With Better Voltage-Balancing Ability for Half-Bridge Three-Level DC/DC Converter," in IEEE Transactions on Power Electronics, vol. 33, No. 6, pp. 4594-4598, Jun. 2018.

Corresponding extended European search report dated Jun. 11, 2021.

Li et al., "Flying-Capacitor-Based Hybrid LLC Converters With Input Voltage Autobalance Ability for High Voltage Applications," in IEEE Transactions on Power Electronics, vol. 31, No. 3, pp. 1908-1920, Mar. 2016.

Corresponding China Office Action dated Mar. 3, 2022 with its English translation.

* cited by examiner

DC/DC CONVERTER AND NEUTRAL-POINT VOLTAGE BALANCE CONTROL METHOD THEREOF

CROSS-REFERENCE TO RELATED APPLICATIONS

This application claims priority to Chinese Patent Application No. 202010049402.6, filed on Jan. 16, 2020 and entitled "DC/DC CONVERTER AND CONTROL METHOD THEREOF", which is hereby incorporated by reference in its entirety.

TECHNICAL FIELD

The present disclosure relates to the field of power supply technologies and, in particular to a Direct Current/Direct Current (DC/DC) converter and a control method of the DC/DC converter.

BACKGROUND

High-voltage DC/DC converters are key parts of some high-power DC conversion systems, and are widely used in high-power DC conversion systems, new energy storage systems, electric vehicle charging devices, rail transit power distribution systems, and the like. In order to reduce wire loss and costs, increase voltage levels and reduce the number of cascaded units, a high-voltage DC/DC converter usually uses a 3-level circuit to achieve high-voltage input. Under the influence of factors such as inconsistent hardware parameters, a neutral-point voltage of the 3-level circuit will become unbalanced, which affects device safety and normal operation of the converter. It is necessary to balance the neutral-point voltage.

Therefore, a control method of a DC/DC converter is desirable, according to which neutral-point voltage regulation (neutral-point balancing) can be performed on the DC/DC converter.

It should be noted that the information disclosed in the above background section is only used to strengthen the understanding of the background of the present disclosure, and thus may include information that does not constitute the prior art known to those of ordinary skilled in the art.

SUMMARY

The present disclosure provides a control method of a DC/DC converter and the DC/DC converter, where the method adjusts the neutral-point potential balance of the DC/DC converter.

According to a first aspect of the embodiments of the present disclosure, provided is a control method of a DC/DC converter applied to the DC/DC converter. Where the DC/DC converter includes a first switching circuit. The first switching circuit includes: a first capacitor and a second capacitor coupled to a first node. A second terminal of the first capacitor is coupled to a second node, and a second terminal of the second capacitor is coupled to a third node. The first switching circuit further includes a first bridge arm coupled between the first node and the second node, and a second bridge arm coupled between the first node and the third node. The first bridge arm includes a first switch and a second switch coupled to a fourth node, and the second bridge arm includes a third switch and a fourth switch coupled to a fifth node. The DC/DC converter further includes a first passive network electrically connected to the fourth node and the fifth node.

Where the method includes the following steps.

Outputting a first control signal, a second control signal, a third control signal and a fourth control signal to control terminals of the first switch, the second switch, the third switch and the fourth switch respectively. Where the first control signal, the second control signal, the third control signal and the fourth control signal are all a square wave signal with a preset period. The first control signal is complementary to the second control signal, the third control signal is complementary to the fourth control signal. Respective corresponding desired operating states of the switches in a 1-level state include: 1) a corresponding desired operating state of the first switch and the third switch is an ON state; and 2) a corresponding desired operating state of the second switch and the fourth switch is an ON state.

Detecting a first voltage across the first capacitor and a second voltage across the second capacitor.

Selecting, according to a difference between the first voltage and the second voltage and a direction of an average current from the fourth node to the first passive network in the 1-level state. The respective corresponding desired operating states of the switches in the 1-level state to enable the voltage difference between the first capacitor and the second capacitor to be reduced.

According to a second aspect of the embodiments of the present disclosure, provided is a DC/DC converter, which includes a first switching circuit, where the first switching circuit includes a first capacitor, a second capacitor, a first bridge arm and a second bridge arm.

The first capacitor has its first terminal coupled to a first node and its second terminal coupled to a second node.

The second capacitor has its first terminal coupled to the first node and its second terminal coupled to a third node.

The first bridge arm is coupled between the first node and the second node, and includes a first switch and a second switch coupled to a fourth node.

The second bridge arm is coupled between the first node and the third node, and includes a third switch and a fourth switch coupled to a fifth node.

The DC/DC converter further includes: a first passive network electrically connected to the fourth node and the fifth node.

The DC/DC converter further includes: a control module, coupled to the first capacitor, the second capacitor, the first bridge arm and the second bridge arm, and configured to:

output a first control signal, a second control signal, a third control signal and a fourth control signal to control terminals of the first switch, the second switch, the third switch and the fourth switch. Where the first control signal, the second control signal, the third control signal and the fourth control signal are all a square wave signal with a preset period, the first control signal is complementary to the second control signal, the third control signal is complementary to the fourth control signal. Respective corresponding desired operating states of the switches in a 1-level state include: 1) a corresponding desired operating state of the first switch and the third switch is an ON state; and 2) a corresponding desired operating state of the second switch and the fourth switch is an ON state.

The control module includes: a detecting unit configured to detect a first voltage across the first capacitor and a second voltage across the second capacitor.

The control module further includes: a unit for determining the operating states of the switches, configured to determine, according to a difference between the first voltage and the second voltage and a direction of an average current from the fourth node to the first passive network in the 1-level state. The respective corresponding desired operating states of the first switch, the second switch, the third switch and the fourth switch in the 1-level state.

The control module further includes: a control signal outputting unit, configured to output a first control signal, a second control signal, a third control signal and a fourth control signal according to the selected respective corresponding desired operating states of the first switch, the second switch, the third switch and the fourth switch in the 1-level state to enable the voltage difference between the first capacitor and the second capacitor to be reduced.

The control method of the DC/DC converter provided in the embodiment of the present disclosure allows for: detecting a difference between a first voltage and a second voltage; selecting desired operating states of respective switches in a 1-level state according to the difference between the first voltage and the second voltage and a direction of an average current from a fourth node to a first passive network in the 1-level state to enable the voltage difference between the first capacitor and the second capacitor to be reduced, thereby effectively adjusting the neutral-point voltage balance of the DC/DC converter.

BRIEF DESCRIPTION OF DRAWINGS

In order to explain the technical solutions in the embodiments of the present disclosure or the prior art more clearly, the following will briefly introduce the drawings used for description of the embodiments or the prior art. Obviously, the drawings in the following description are some embodiments of the present disclosure. For those of ordinary skill in the art, other drawings can be obtained based on these drawings without any creative effort.

DESCRIPTION OF EMBODIMENTS

Figure 1:
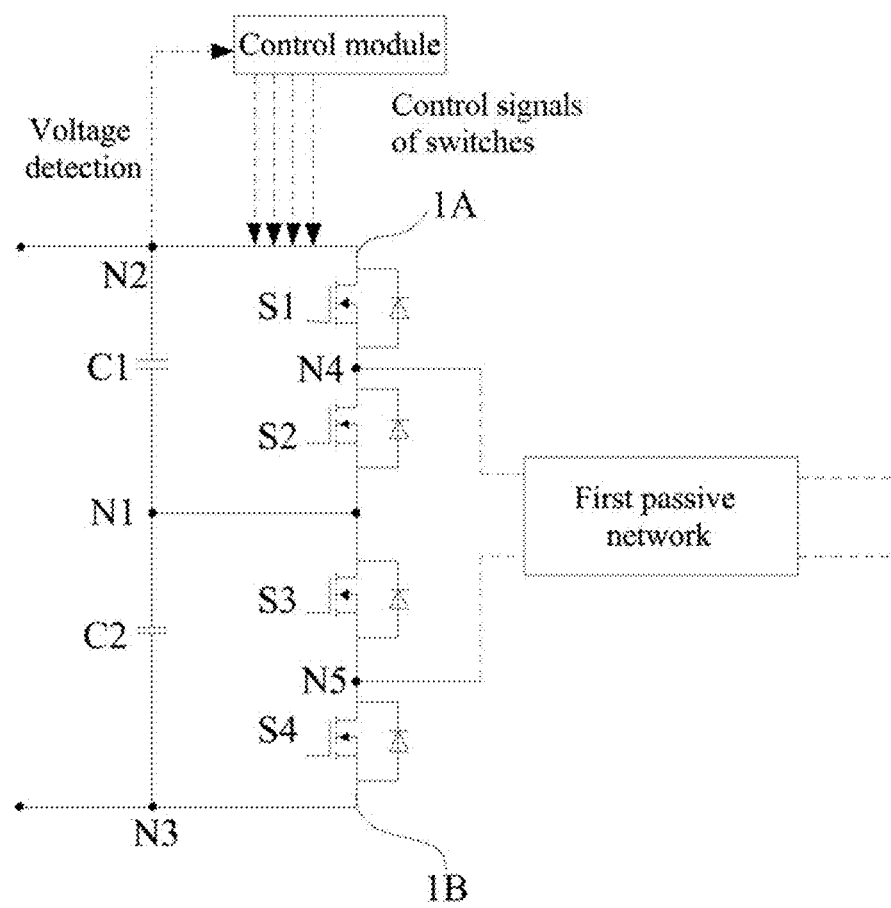
FIG. 1 is a schematic diagram of a DC/DC converter using a 3-level circuit.

Exemplary embodiments will now be described more comprehensively with reference to the accompanying drawings. However, the exemplary embodiments can be implemented in various forms, and should not be construed as being limited to the examples set forth herein; on the contrary, the provision of these embodiments makes the present disclosure more comprehensive and complete, and the concept of the exemplary embodiments is fully conveyed to those skilled in the art. The described features, structures or characteristics may be combined in one or more embodiments in any suitable way. In the following description, many specific details are provided to give a sufficient understanding of the embodiments of the present disclosure. However, it will be aware to those skilled in the art that the technical solutions of the present disclosure can be practiced without one or more of the specific details, or other methods, components, devices, steps, etc. can be used. In other cases, the well-known technical solutions are not shown or described in detail to avoid distractions so that aspects of the present disclosure become obscured.

In addition, the drawings are only schematic illustrations of the present disclosure, and the same reference numerals in the drawings denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices. The exemplary embodiments of the present disclosure will be described in detail below with reference to the accompanying drawings.

FIG. 1 is a schematic diagram of a structure of a DC/DC converter using a 3-level circuit. Referring to FIG. 1, the DC/DC converter 100 shown in this embodiment includes: a first switching circuit 101, where the first switching circuit 101 includes: a first capacitor C1, a second capacitor C2, a first bridge arm 1A and a second bridge arm 1B.

For the first capacitor C1, a first terminal of the first capacitor C1 is coupled to a first node N1, and a second terminal of the first capacitor C1 is coupled to a second node N2.

For the second capacitor C2, a first terminal of the second capacitor C2 is coupled to the first node N1, and a second terminal of the second capacitor C2 is coupled to a third node N3.

The first bridge arm 1A is coupled between the first node N1 and the second node N2, and the first bridge arm 1A includes a first switch S1 and a second switch S2 coupled to a fourth nod.

The second bridge arm 1B is coupled between the first node N1 and the third node N3, and the second bridge arm 1B includes a third switch S3 and a fourth switch S4 coupled to a fifth node N5.

The DC/DC converter 100 further includes: a first passive network 102 and a control module 103, where the first passive network 102 is electrically connected to the fourth node N4 and the fifth node N5.

The control module 103 is coupled to the first capacitor C1, the second capacitor C2, the first bridge arm 1A and the second bridge arm 1B. The control module 103 is configured to output a first control signal, a second control signal, a third control signal and a fourth control signal respectively to control terminals of the first switch S1, the second switch S2, the third switch S3 and the fourth switch S4, where the first control signal, the second control signal, the third control signal and the fourth control signal are all a square wave signal with a preset period. The first control signal is complementary to the second control signal, and the third control signal is complementary to the fourth control signal.

Respective corresponding desired operating states of the above-mentioned switches in a 1-level state include: 1) the first switch S1 and the third switch S3 are ON; and 2) the second switch S2 and the fourth switch S4 are ON.

Figure 16:
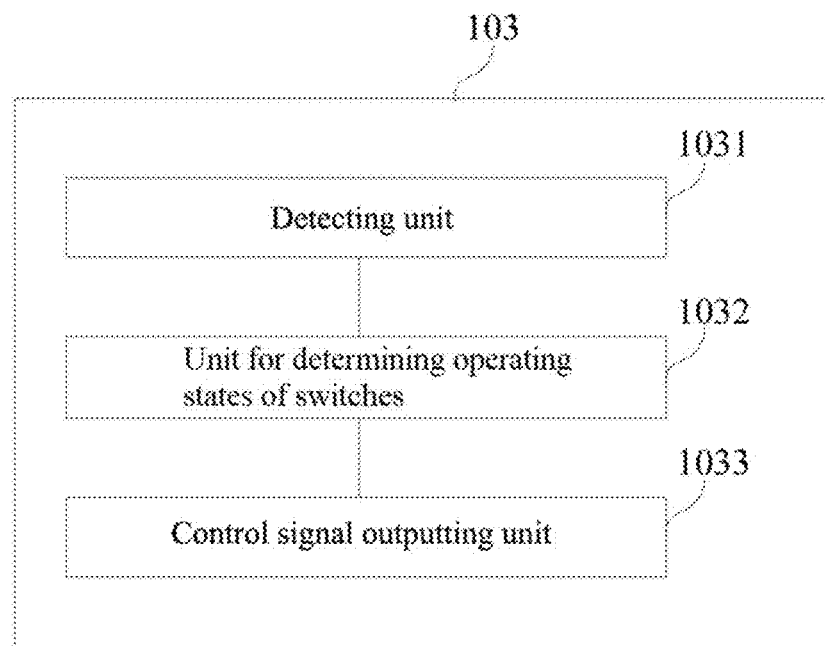
FIG. 16 is a schematic diagram of a structure of a control module provided by the disclosure.

Further, referring to FIG. 16, the control module 103 includes: a detecting unit 1031, a unit for determining the operating states of the switches 1032, and a control signal outputting unit 1033.

Where the detecting unit 1031 is configured to detect a first voltage across the first capacitor C1 and a second voltage across the second capacitor C2.

The unit for determining the operating states of the switches 1032 is configured to determine the respective corresponding desired operating states of the first switch S1, the second switch S2, the third switch S3 and the fourth switch S4 according to a difference between the first voltage and the second voltage and a direction of an average current from the fourth node N4 to the first passive network 102 in the 1-level state.

The control signal outputting unit 1033 is configured to output a first control signal, a second control signal, a third control signal and a fourth control signal according to the respective corresponding desired operating states of the first switch S1, the second switch S2, the third switch S3 and the fourth switch S4 in the 1-level state that are determined by the unit for determining the operating states of the switches 1032 to enable the voltage difference between the first capacitor C1 and the second capacitor C2 to be reduced.

In some possible designs, the unit for determining the operating states of the switches 1032 is further configured to: if the difference between an absolute value of the first voltage and the second voltage is greater than or equal to a preset value, determine the respective corresponding desired operating states of the first switch S1, the second switch S2, the third switch S3 and the fourth switch S4 according to the difference between the first voltage and the second voltage and the direction of the average current from the fourth node N4 to the first passive network 102 in the 1-level state.

Where the preset value is greater than or equal to zero.

The respective corresponding desired operating states of the first switch S1, the second switch S2, the third switch S3 and the fourth switch S4 are determined according to the difference between the first voltage and the second voltage and the direction of the average current from the fourth node N4 to the first passive network 102 in the 1-level state by the following manner.

If the difference between the first voltage and the second voltage is a positive value and the direction of the average current from the fourth node N4 to the first passive network 102 in the 1-level state is a positive direction, determining the corresponding desired operating state of the first switch S1 and the third switch S3 in the 1-level state to be ON and the corresponding desired operating state of the second switch S2 and the fourth switch S4 to be OFF.

If the difference between the first voltage and the second voltage is a negative value and the direction of the average current from the fourth node N4 to the first passive network 102 in the 1-level state is a positive direction, determining the corresponding desired operating state of the second switch S2 and the fourth switch S4 in the 1-level state to be ON and the corresponding desired operating state of the first switch S1 and the third switch S3 to be OFF.

If the difference between the first voltage and the second voltage is a positive value and the direction of the average current from the fourth node N4 to the first passive network 102 in the 1-level state is a negative direction, determining the corresponding desired operating state of the second switch S2 and the fourth switch S4 in the 1-level state to be ON and the corresponding desired operating state of the first switch S1 and the third switch S3 to be OFF.

If the difference between the first voltage and the second voltage is a negative value and the direction of the average current from the fourth node N4 to the first passive network 102 in the 1-level state is a negative direction, determining the corresponding desired operating state of the first switch S1 and the third switch S3 in the 1-level state to be ON and the corresponding desired operating state of the second switch S2 and the fourth switch S4 to be OFF.

It should be noted that, in the above description, the average current from the fourth node to the first passive network in the 1-level state is the average current from the fourth node to the first passive network in a current time of the 1-level state, and the positive direction of the average current indicates that the current flows from the fourth node to the first passive network; and the negative direction of the average current indicates that the current flows from the first passive network to the fourth node.

Figure 2:
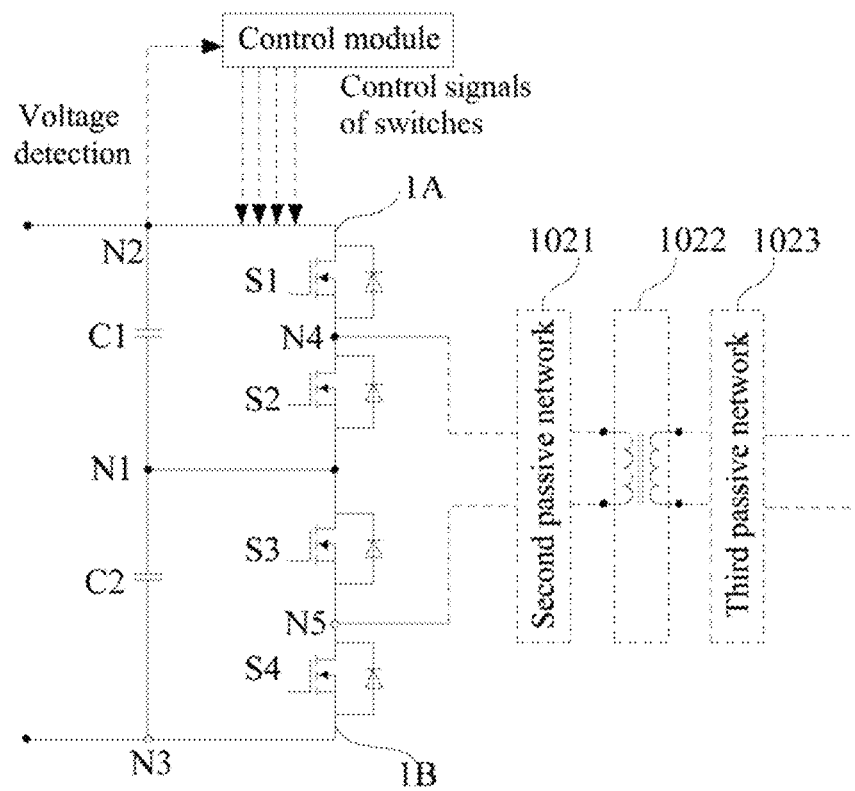
FIG. 2 is a schematic diagram of another structure of the DC/DC converter using the 3-level circuit shown in FIG. 1.

FIG. 2 is a schematic diagram of another structure of the DC/DC converter using the 3-level circuit shown in FIG. 1. Referring to FIG. 2:

In the DC/DC converter 100, the first passive network 102 is electrically connected to the fourth node N4 and the fifth node N5.

Where the first passive network 102 may only include a second passive network 1021, or, the first passive network 102 may include the second passive network 1021 and a transformer 1022 at the same time, or the first passive network 102 may include the second passive network 1021, the transformer 1022 and a third passive network 1023 at the same time, or the first passive network 102 may include the transformer 1022 and the third passive network 1023 at the same time.

When the first passive network 102 only includes the second passive network 1021: the second passive network 1021 is electrically connected to the fourth node N4 and the fifth node N5, and the second passive network 1021 is also electrically connected to the output.

When the first passive network 102 includes the second passive network 1021 and the transformer 1022 at the same time: the second passive network 1021 is electrically connected to the fourth node N4 and the fifth node N5, the primary winding of the transformer 1022 is electrically connected to the second passive network 1021, and the secondary winding of the transformer 1022 is electrically connected to a second switching circuit 104.

When the first passive network 102 includes the transformer 1022 and the third passive network 1023 at the same time: the primary winding of the transformer 1022 is electrically connected to the fourth node N4 and the fifth node N5, and the secondary winding of the transformer 1022 is electrically connected to the second switching circuit 104, the third passive network 1023 is coupled between the transformer 1022 and the second switching circuit 104.

When the first passive network 102 includes the second passive network 1021, the transformer 1022, and the third passive network 1023 at the same time: the second passive network 1021 is electrically connected to the fourth node N4 and the fifth node N5, the primary winding of the transformer 1022 is electrically connected to the second passive network 1021, and the secondary winding of the transformer 1022 is electrically connected to the second switching circuit 104, the third passive network 1023 is coupled between the secondary winding of the transformer 1022 and the second switching circuit 104.

It should be noted that the second switching circuit 104 is not shown in FIG. 2.

Among the various possible implementations described above, the second passive network 1021 and/or the third passive network 1023 may include a capacitor and an inductor in series connection, in parallel connection, or in series-parallel connection, or the second passive network 1021 only includes a capacitor. In the present disclosure, the specific implementation of the second passive network 1021 and/or the third passive network 1023 is not limited.

Common 3-level circuit includes a diode neutral point clamped (DNPC) structure and a series dual half-bridge (SHB) structure. Where the series dual half-bridge structure is shown in FIG. 1 and FIG. 2. The first bridge arm and the second bridge arm form two half bridges in series through four active devices connected in series, and this structure is called a series dual half-bridge (SHB) structure. The SHB structure consists of 4 switches, and the SHB structure can output three levels of +2, +1 and 0. For the DC/DC converter, the series dual half-bridge structure is simple and has higher system efficiency.

Figure 3:
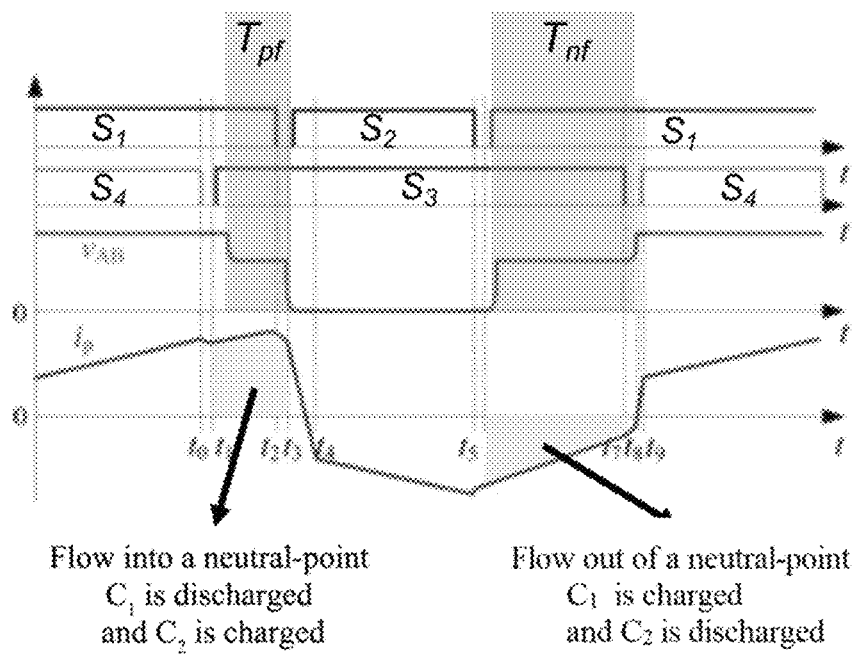
FIG. 3 is a schematic diagram of a control method in prior arts.

In order to solve the problem of controlling of the neutral-point voltage balance of the DC/DC converter using the 3-level circuit, a control method of the neutral-point voltage balance based on duty cycle modulation is proposed in prior arts, for example, when 0/1/2 3-level modulation is performed, with reference to FIG. 3, the control signal of the first switch S1 and the control signal of the second switch S2 are complementarily turned on, and the third switch S3 and the fourth switch S4 are complementarily turned on. The duty cycle of the control signals of S1 and S3 is greater than 50%, and the duty cycle of the control signals of S2 and S4 is less than 50%. Time t0 to Time t9 represents a switching period. During the period from t1 to t2, S1 and S3 are ON, and S2 and S4 are OFF; the voltage $v_{AB}$ between the fourth node N4 and the fifth node N5 of the DC/DC converter is 1-level; and the direction of the average current from the fourth node to the first passive network is a positive direction. The current $i_p$ flows into the neutral-point (that is, the first node N1) through S1 and S3. During the period from t6 to t7, S1 and S3 are ON, and S2 and S4 are OFF; the DC/DC converter outputs 1-level; the direction of the average current from the fourth node to the first passive network is a negative direction; and the current $i_p$ flows out of the neutral-point (that is, the first node N1) through S1 and S3. In a switching period shown in FIG. 3, the two 1-level states have opposite effects on the neutral-point voltage. Therefore, in the prior arts, the neutral-point voltage balance is controlled by adjusting effect time in 1-level states in the positive and negative half-cycles in one switching period. For example, if the voltage across the first capacitor is greater than the voltage across the second capacitor, in one switching period, controlling Tpf<Tnf so that the current flowing out of the neutral-point is greater than the current flowing into the neutral-point during one switching period, thereby achieving a drop in the voltage $U_{dc2}$ across the second capacitor and a raise in the voltage $U_{dc1}$ across the first capacitor, and realizing the adjustment of the neutral-point voltage.

In this control method based on duty cycle modulation, since the 1-level states in the positive and negative half cycles have unequal effect time, resulting in an asymmetrical operating mode of the DC/DC converter in one switching period, which in turn causes the switches to be different in turn-off current. It is difficult to ensure that all switches realize zero voltage switching (ZVS), moreover, the above-mentioned method causes uneven conduction loss and switching loss, which affects the thermal design. Therefore, in the prior arts, the method of controlling the neutral-point voltage balance with reliance on the difference of effect time between the 1-level states has poor regulation performance.

In view of the problem in the related arts, the present disclosure proposes a control method. In the control method, desired operating states of the switches in a 1-level state within one switching period are selected according to the voltage difference between the first capacitor and the second capacitor and the direction of the average current from the fourth node to the first passive network in the 1-level state, thereby achieving the control of the neutral-point voltage balance. This control method has a stronger ability of adjusting the neutral-point voltage balance, and does not affect the realization of the ZVS of the converter, and can balance the switching loss and conduction loss of the switches. It is suitable for various kinds of resonant or non-resonant, unidirectional or bidirectional DC/DC conversion circuits which use the series dual half-bridge 3-level structure as the input terminal.

The control method proposed in the present disclosure is described in detail below.

Figure 4A:
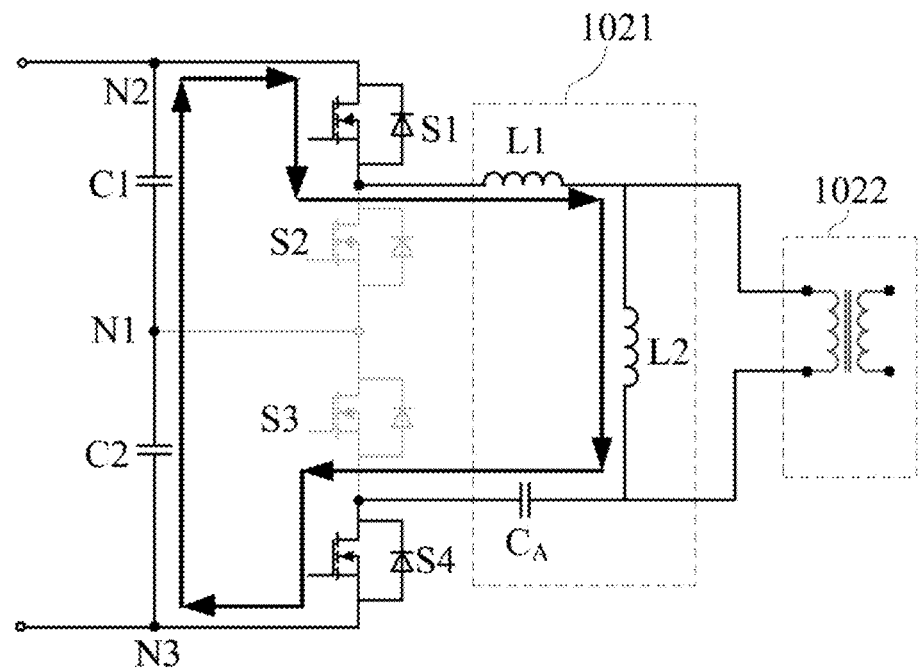
FIG. 4A-FIG. 4D are schematic diagrams of four switching states of a series dual half-bridge 3-level circuit provided by the present disclosure.

As is shown in FIG. 4A, when the first switch S1 and the fourth switch S4 are simultaneously turned on, the first capacitor C1 and the second capacitor C2 are connected in series to the DC/DC converter. The total output voltage at the neutral-point of the first bridge arm 1A and the neutral-point of the second bridge arm 1B is the sum of the voltage $U_{dc1}$ across the first capacitor C1 and the voltage $U_{dc2}$ across the second capacitor C2. The output level is 2, the neutral-point is not connected to the circuit, that is, the first node N1 is not connected to the circuit, and the switching state shown in FIG. 4A has no effect on the neutral-point voltage.

Figure 4B:
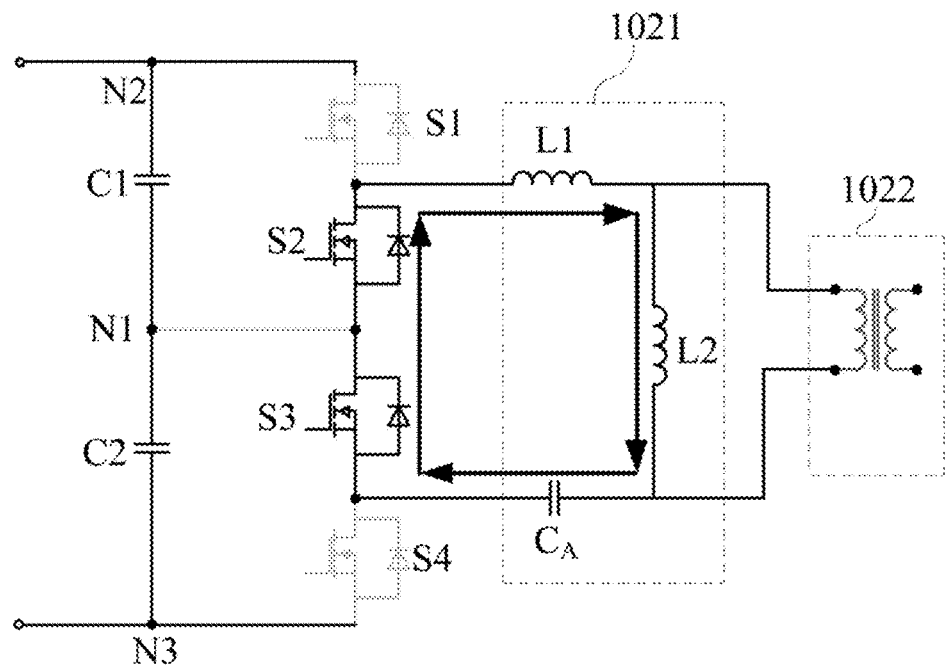

As is shown in FIG. 4B, when the second switch S2 and the third switch S3 are simultaneously turned on, the first capacitor C1 and the second capacitor C2 are not connected to the DC/DC converter. The total output voltage at the neutral-point of the first bridge arm 1A and the neutral-point of the second bridge arm 1B is 0. The output level is 0, the neutral-point is not connected to the circuit, that is, the first node N1 is not connected to the circuit, and the switching state has no effect on the neutral-point voltage.

Figure 4C:
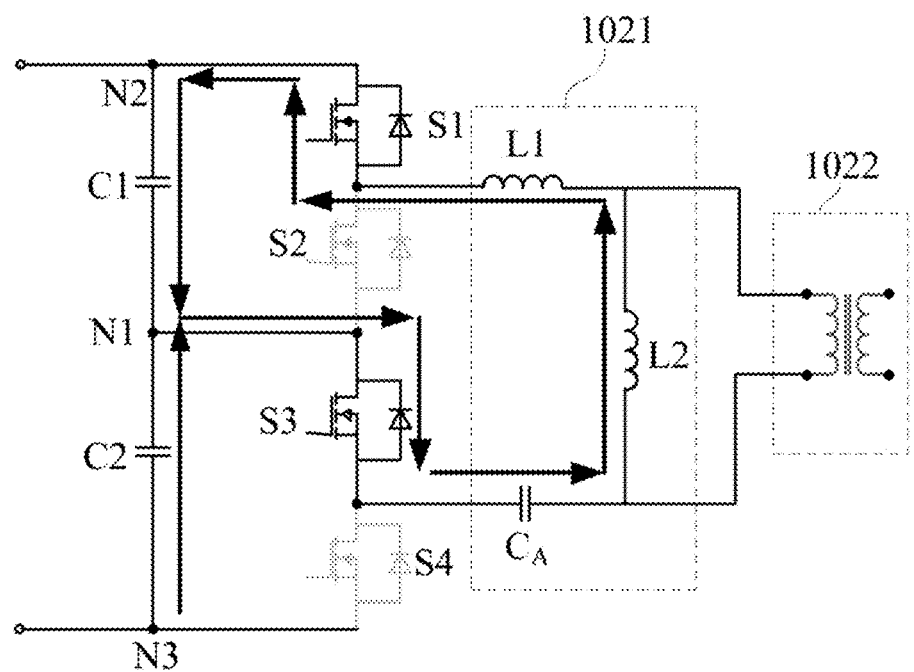

As is shown in FIG. 4C, when the first switch S1 and the third switch S3 are turned on at the same time, the total output voltage at the neutral-point of the first bridge arm 1A and the neutral-point of the second bridge arm 1B is the voltage $U_{dc1}$ across the first capacitor C1. The output level is 1, the neutral-point N1 is connected to the DC/DC converter, and the current flows out of the neutral-point through the first switch S1 and the third switch S3 in this switching state.

Figure 4D:
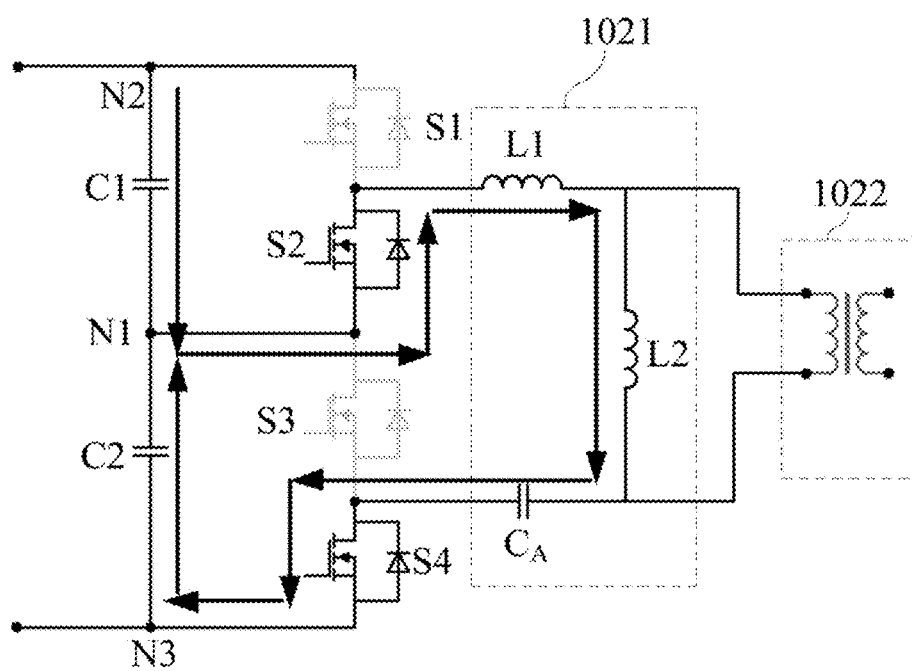

As is shown in FIG. 4D, when the second switch S2 and the fourth switch S4 are turned on at the same time, the total output voltage at the neutral-point of the first bridge arm 1A and the neutral-point of the second bridge arm 1B is the voltage $U_{dc2}$ across the second capacitor C2. The output level is 1, the neutral-point N1 is connected to the DC/DC converter, and the current flows out of the neutral-point through the second switch S2 and the fourth switch S4 in this switching state.

Among the above four switching states, the switching states corresponding to the 0 level and the 2 level have no effect on the potential at the neutral-point N1. Therefore, in the embodiment of the present disclosure, the adjustment of the neutral-point voltage is realized by using the 1-level state.

For the first switching circuit, multiple modulation modes can be obtained based on different combinations of the above multiple switching states. The modulation mode of the first switching circuit may include: any one or a combination of 0/1 2-level modulation, 1/2 2-level modulation or 0/1/2 3-level modulation, the following is a respective detailed introduction to the various different modulation modes above.

I. 0/1 2-Level Modulation

Figure 5A:
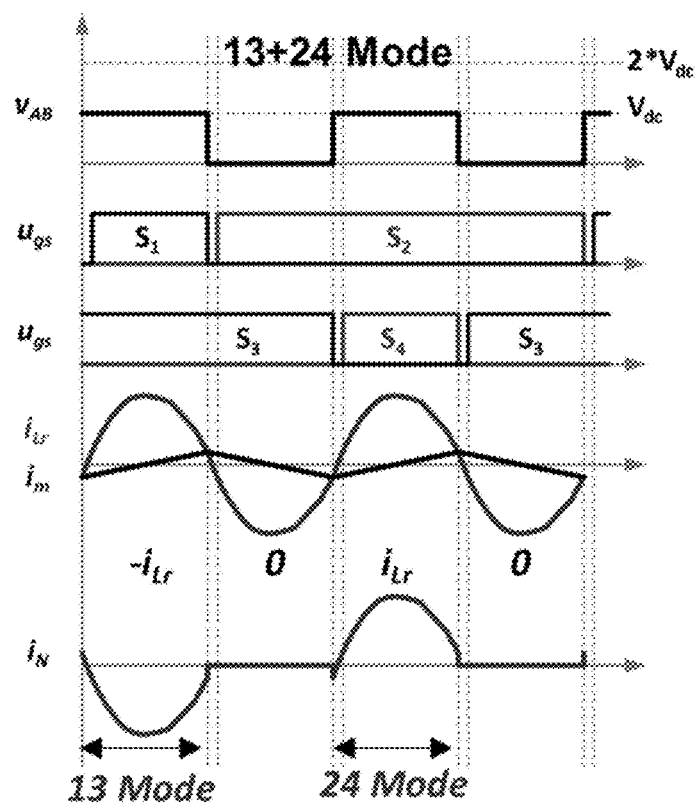
FIG. 5A-FIG. 5C are schematic diagrams of a control method provided by the present disclosure.

When the DC/DC converter operates in the 0/1 2-level modulation, as shown in FIG. 5A, in a steady state, S1 and S2 are complementarily turned on, S3 and S4 are complementarily turned on, and the duty cycle of the control signals of S1 and S4 is 25%, and the phases of S1 and S4 are interleaved by 180 degrees. The output voltage of the DC/DC converter is switched between 0-level and 1-level, and the equivalent frequency is twice the switching frequency.

Where in FIG. 5A, v represents the level between the fourth node N4 and the fifth node N5, Ugs is the control signal level of each switch, $i_{Lr}$ is the current from the fourth node N4 to the first passive network, $i_m$ is the excitation current of the transformer, and $i_N$ is the current of the first node N1, that is, the neutral-point current. In the subsequent embodiments, the aforementioned parameters represent the same meaning.

As is shown in FIG. 5A, in the steady state, within a switching period, the switching state corresponding to the first 1-level state is that S1 and S3 are in the ON state, and the switching state corresponding to the second 1-level state is that S2 and S4 are in the ON state, and the two 1-level states have the same effect duration, opposite directions for the current flowing through the neutral-point, and mutually cancelling effects on the neutral-point voltage. It should be noted that "13+24 Mode" in FIG. 5A represents that in the steady state, the two one-level states in one switching period are respectively "13Mode" and "24Mode". Where "13Mode" represents a state in which the first switch S1 and the third switch S3 are simultaneously turned on in a 1-level state, and "24Mode" represents a state in which the second switch S2 and the fourth switch S4 are simultaneously turned on in a 1-level state.

Based on the 0/1 2-level modulation, if the difference between the first voltage and the second voltage is a negative value, it is necessary to control the neutral-point voltage to drop and control the neutral-point current to flow out of the neutral-point. If the direction of the average current from the fourth node to the first passive network in the 1-level state is a positive direction, then in the both of 1-level states within one switching period, the desired operating state of the second switch and the fourth switch is selected to be an ON state and the desired operating state of the first switch and the third switch is selected to be an OFF state. If the direction of the average current from the fourth node to the first passive network in the 1-level state is a negative direction, then in the both of 1-level states within one switching period, the desired operating state of the first switch and the third switch is selected to be an ON state and the desired operating state of the second switch and the fourth switch is selected to be an OFF state.

If the difference between the first voltage and the second voltage is a positive value, it is necessary to control the neutral-point voltage to rise and control the neutral-point current to flow into the neutral-point. If the direction of the average current from the fourth node to the first passive network in the 1-level state is a positive direction, then in the both of 1-level states within one switching period, the desired operating state of the first switch and the third switch is selected to be an ON state and the desired operating state of the second switch and the fourth switch is selected to be an OFF state. If the direction of the average current from the fourth node to the first passive network in the 1-level state is a negative direction, then in the both of 1-level states within one switching period, the desired operating state of the second switch and the fourth switch is selected to be an ON state and the desired operating state of the first switch and the third switch is selected to be an OFF state.

Figure 5B:
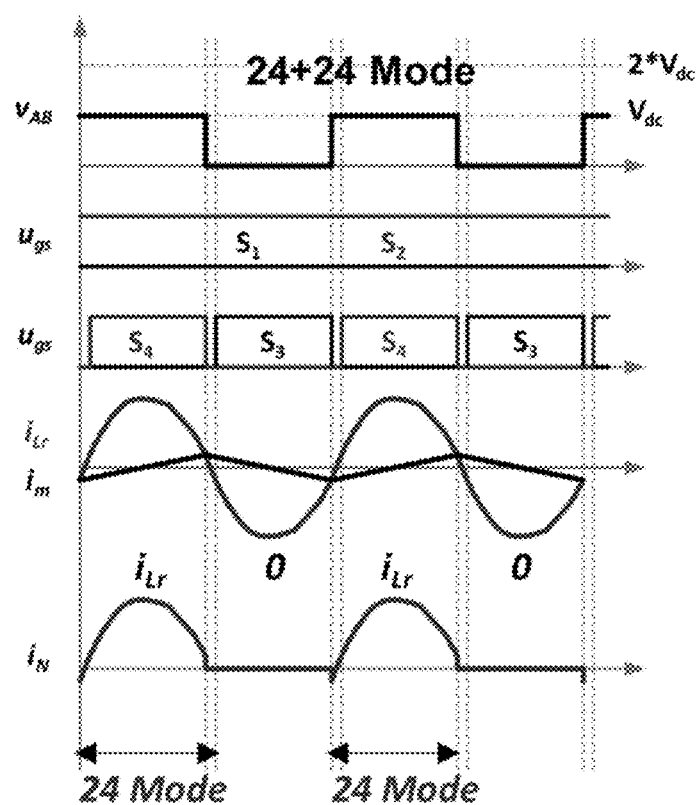

As is shown in FIG. 5B, in one switching period, for both of the 1-level states, the desired operating state of the second switch S2 and the fourth switch S4 is selected to be an ON state and the desired operating state of the first switch S1 and the third switch S3 is selected to be an OFF state. Combining FIG. 5A and FIG. 5B, it can be seen that the effect time of the two 1-level states shown in FIG. 5B is the same as that of the two 1-level states in the steady state, and in one switching period shown in FIG. 5B, the positive and negative half cycles have a completely symmetrical operating mode. It should be noted that "24+24 Mode" in FIG. 5B represents that the two 1-level states in one switching period are all "24Mode", where "24Mode" represents a state in which the second switch S2 and the fourth switch S4 are simultaneously turned on in the 1-level state.

Figure 5C:
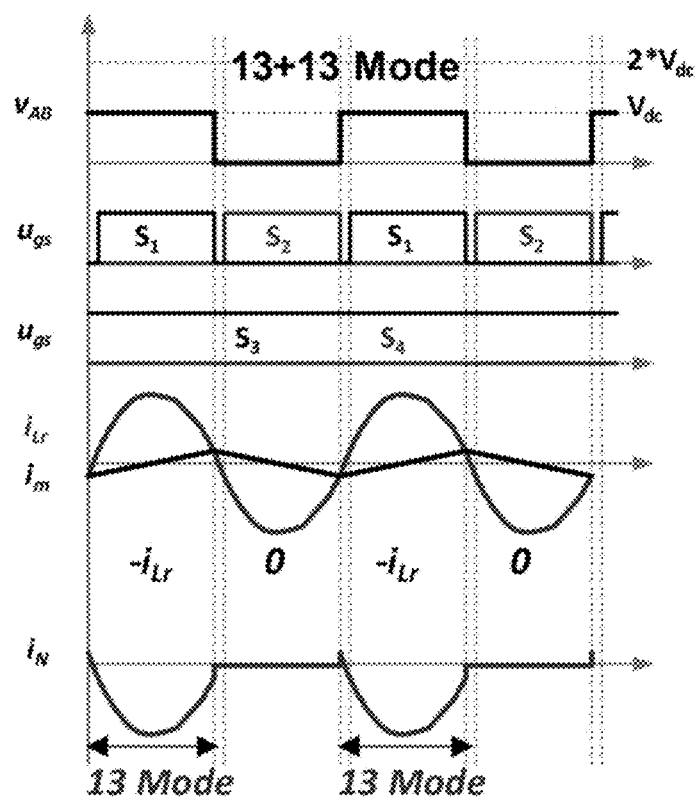

As is shown in FIG. 5C, in one switching cycle, for both of the 1-level states, the desired operating state of the first switch S1 and the third switch S3 is selected to be an ON state and the desired operating state of the second switch S2 and the fourth switch S4 is selected to be an OFF state. Combining FIG. 5A and FIG. 5C, it can be seen that the effect time of the two 1-level states shown in FIG. 5C is the same as that of the two 1-level states in the steady state, and in one switching period shown in FIG. 5C, the positive and negative half periods have a completely symmetrical operating mode. It should be noted that "13+13 Mode" in FIG. 5C represents that the two one-level states in one switching period are all "13Mode", where "13Mode" represents a state in which the first switch S1 and the third switch S3 are simultaneously turned on in the 1-level state.

When the control of the neutral-point voltage balance is performed, by selecting the above-described states shown in FIG. 5B or FIG. 5C, the positive and negative half periods have exactly the same operating mode, and the effect of the positive and negative half periods on the neutral-point is superimposed to obtain a stronger regulation ability. In addition, since the bridge arms of the DC/DC converter provided by the present disclosure are symmetrical in current, it is advantageous for the switches to realize ZVS.

Figure 6:
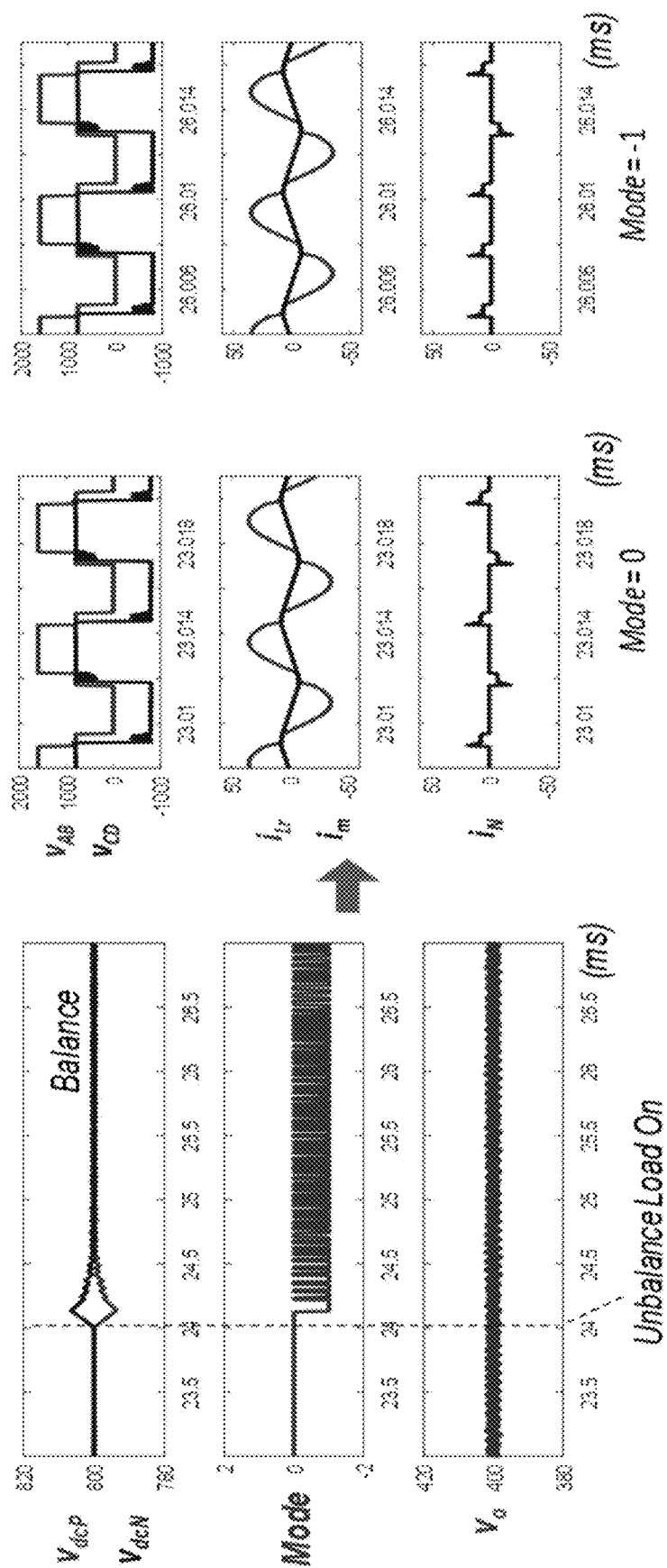
FIG. 6 is a simulation waveform of the method shown in FIG. 5A-FIG. 5C applied to the circuit shown in FIG. 2.

FIG. 6 is a simulation waveform of the control method shown in FIG. 5A-FIG. 5C applied to the circuit shown in FIG. 2.

As shown in FIG. 6, the neutral-point voltage unbalance is simulated starting from the time of 6 ms, the voltages across the two input capacitors are configured such that the first voltage $U_{dcP}$ across the first capacitor increases and the second voltage $U_{dcN}$ across the second capacitor decreases. Using the control method shown in FIG. 5A-FIG. 5C, operating states of the respective switches in the both of 1-level state within one switching period is selected according to the difference between the first voltage and the second voltage and the direction of the average current from the fourth node to the first passive network in the 1-level state, and then corresponding control information is output according to the operating states of the respective switches in the 1-level state are desired operating states, thereby achieving a drop in the neutral-point voltage so that the first voltage across the first capacitor and the second voltage across the second capacitor tend to balance again.

And referring to the simulation waveform shown in FIG. 6, it can be seen that, in the situation shown in FIG. 5A (that is, the situation Mode=0 as marked in FIG. 6) and the situation shown in FIG. 5B (that is, the situation Mode=−1 as marked in FIG. 6), the bridge arms have exactly the same voltage and resonance current, and the output voltage of the DC/DC converter is not affected by the neutral-point voltage balance control.

Similarly, the implementation based on 1/2 2-level modulation is similar to the above implementation based on 0/1 2-level modulation.

II. 0/1/2 3-Level Modulation

When the DC/DC converter operates in 0/1/2 3-level modulation, in the steady state, S1 and S2 are complementarily turned on, and S3 and S4 are complementarily turned on. The duty ratio of the control signals of S1 and S3 is greater than 50%, and the phases of S1 and S4 are synchronized. The output voltage at the neutral-point of the first bridge arm 1A and the neutral-point of the second bridge arm 1B of the DC/DC converter is switched among 0 level, 1 level and 2 level, and the equivalent frequency is the switching frequency.

It should be noted that, in this embodiment, description is made by taking an example where the duty cycle of the control signals of S1 and S3 is greater than or equal to 50%. The implementation of the neutral-point voltage balance control when the duty cycle of the control signals of S1 and S3 is less than or equal to 50% is similar to the implementation of the neutral-point voltage balance control when the duty cycle of the control signals of S1 and S3 is greater than 50%.

Figure 7A:
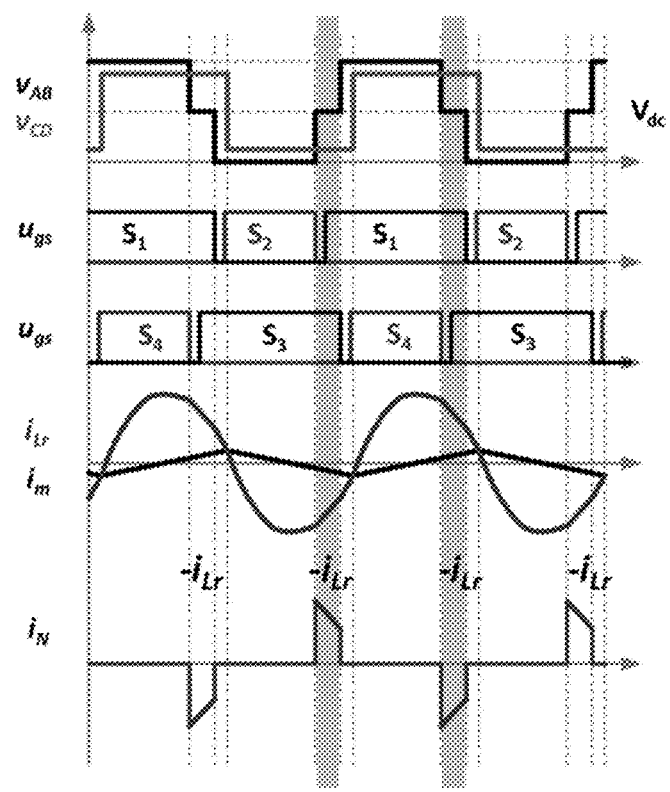
FIG. 7A-FIG. 7C are another schematic diagrams of the control method provided by the present disclosure.

As shown in FIG. 7A, in the steady state, the first bridge arm 1A and the second bridge arm 1B have 4 switching states in one switching period, respectively: (1) S1 and S4 are turned on at the same time, the output voltage at the bridge arm is the sum of the first voltage and the second voltage, the output level is 2, and the neutral-point is not connected to the circuit; (2) S1 and S3 are turned on at the same time, the output voltage at the bridge arm is the voltage across the first capacitor, the output level is 1, and the neutral-point is connected to the circuit, at this time, the direction of the current from the fourth node to the first passive network is a positive direction, and the current flows into the neutral-point through S1 and S3; (3) S2 and S3 are turned on at the same time, the output voltage at the bridge arm is 0, the output level is 0, the neutral-point is not connected to the circuit, and this state has no effect on the neutral-point voltage; and (4) S1 and S3 are turned on at the same time, the output voltage at the bridge arm is the voltage across the first capacitor, the output level is 1, and the neutral-point is connected to the circuit. At this time, the direction of the current from the fourth node to the first passive network is a negative direction, and the current flows out of the neutral-point through S1 and S3.

In the steady state, the switching states corresponding to the two 1-level states in a switching period are all a state where S1 and S3 are turned on, the two 1-level states have the same effect duration, opposite directions for the current flowing through the neutral-point, and mutually cancelling effects on the neutral-point voltage.

Based on the 0/1/2 3-level modulation of the neutral-point voltage, if the difference between the first voltage and the second voltage is a negative value, it is necessary to control the neutral-point voltage to drop and control the neutral-point current to flow out of the neutral-point.

Figure 7B:
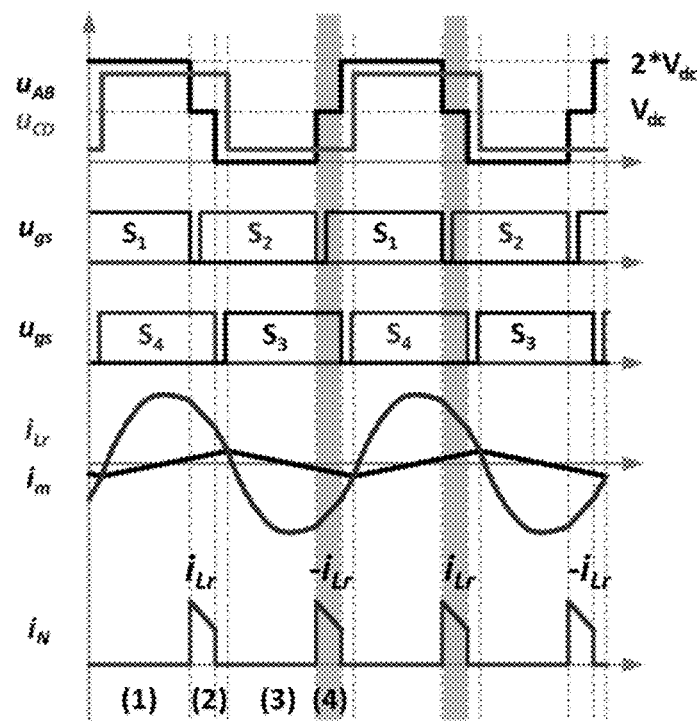

As is shown in FIG. 7B, the difference between the first voltage and the second voltage is a negative value. It is necessary to control the neutral-point voltage to drop and control the neutral-point current to flow out of the neutral-point. In one switching period, for one 1-level state, the direction of the average current from the fourth node to the first passive network in the 1-level state is a negative direction, the desired operating state of the first switch and the third switch is selected to be an ON state and the desired operating state of the second switch and the fourth switch is selected to be an OFF state, and for the other 1-level state, the direction of the average current from the fourth node to the first passive network in the one-level state is a positive direction, the desired operating state of the second switch and the fourth switch is selected to be an ON state and the desired operating state of the first switch and the third switch is selected to be an OFF state. Combining FIG. 7A and FIG. 7B, it can be seen that the effect time of the two 1-level states shown in FIG. 7B is the same as that of the two 1-level states in the steady state, and in one switching period shown in FIG. 7B, the positive and negative half periods have a completely symmetrical operating mode.

Figure 7C:
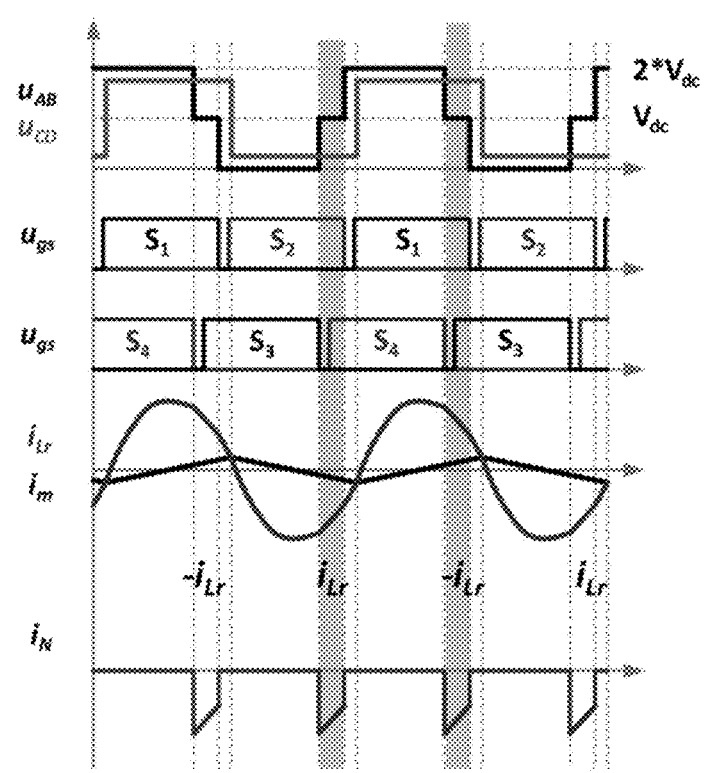

As is shown in FIG. 7C, the difference between the first voltage and the second voltage is a positive value. It is necessary to control the neutral-point voltage to rise and control the neutral-point current to flow into the neutral-point. In one switching period, for one 1-level state, the direction of the average current from the fourth node to the first passive network in the 1-level state is a negative position, the desired operating state of the second switch and the fourth switch is selected to be an ON state and the desired operating state of the first switch and the third switch is selected to be an OFF state, and for the other 1-level state, the direction of the average current from the fourth node to the first passive network in the 1-level state is a positive direction, the desired operating state of the first switch and the third switch is selected to be an ON state and the desired operating state of the second switch and the fourth switch is selected to be an OFF state. Combining FIG. 7A and FIG. 7C, it can be seen that the effect time of the two 1-level states shown in FIG. 7C is the same as that of the two 1-level states in the steady state, and in one switching period shown in FIG. 7C, the positive and negative half cycles have a completely symmetrical operating mode.

When the control of the neutral-point voltage balance is performed, through selection of the state shown in FIG. 7B or FIG. 7C, the positive and negative half periods have exactly the same operating mode, and the effect of the positive and negative half periods on the neutral-point is superimposed to obtain a stronger regulation ability. In addition, since the bridge arms of the DC/DC converter are symmetrical in current, it is advantageous for the switches to realize ZVS.

Figure 8:
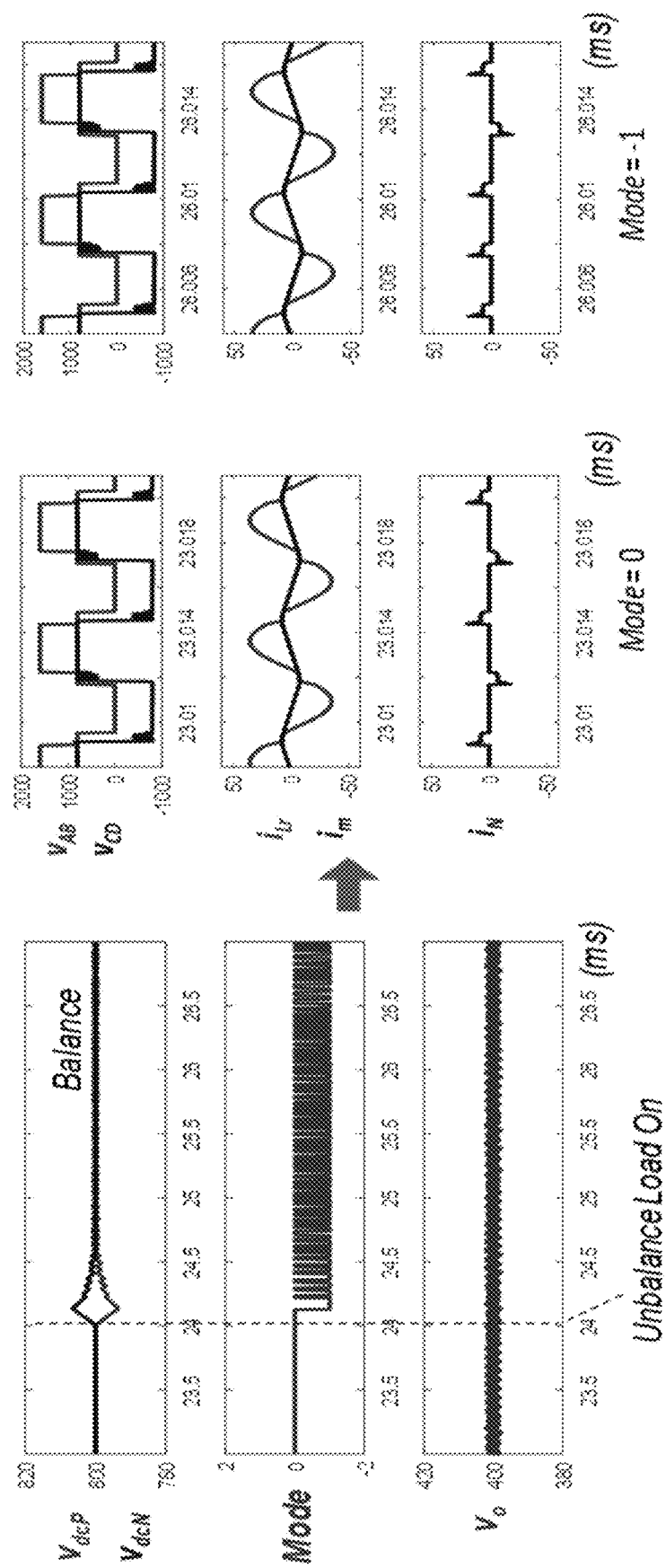
FIG. 8 is a simulation waveform of the method shown in FIG. 7A-FIG. 7C applied to the circuit shown in FIG. 2.

FIG. 8 is a simulation waveform of the control method shown in FIG. 7A-FIG. 7C applied to the circuit shown in FIG. 2.

As shown in FIG. 8, the neutral-point voltage unbalance is simulated starting from the time of 24 ms, the voltages at the two input capacitors are configured such that the first voltage $U_{dcP}$ across the first capacitor increases and the second voltage $U_{dcN}$ across the second capacitor decreases. With the control method shown in FIG. 7A-FIG. 7C, operating states of the respective switches in the two 1-level states within a switching period is selected according to the difference between the first voltage and the second voltage and the direction of the average current from the fourth node to the first passive network in the 1-level state, such that the operating states of the respective switches in the 1-level state is desired operating state, thereby achieving a raise in the neutral-point potential voltage so that the first voltage across the first capacitor and the second voltage across the second capacitor tend to balance again.

And referring to the simulation waveform shown in FIG. 8, it can be seen that, in the situation shown in FIG. 7A (that is, the situation Mode=0 as marked in FIG. 8) and the situation shown in FIG. 7B (that is, the situation Mode=−1 as marked in FIG. 8), the voltage of the bridge arms and resonance current are exactly the same, and the output voltage of the DC/DC converter is not affected by the neutral-point voltage balance control.

Compared with the related arts, the method of controlling neutral-point voltage balance based on the reselected switching state of the switches in the 1-level state has at least the following advantages.

1. The positive and negative half control periods have a completely symmetrical operating mode, and the positive and negative half control periods have the same effect on the neutral-point, and stronger regulation ability can be obtained; 2. the bridge arms of the DC/DC converter are symmetrical in current, and it is beneficial for the switches to realize ZVS; and 3. the stress and loss of the four switches of the first bridge arm and the second bridge arm can be made uniform, and the energy efficiency is improved.

Figure 9:
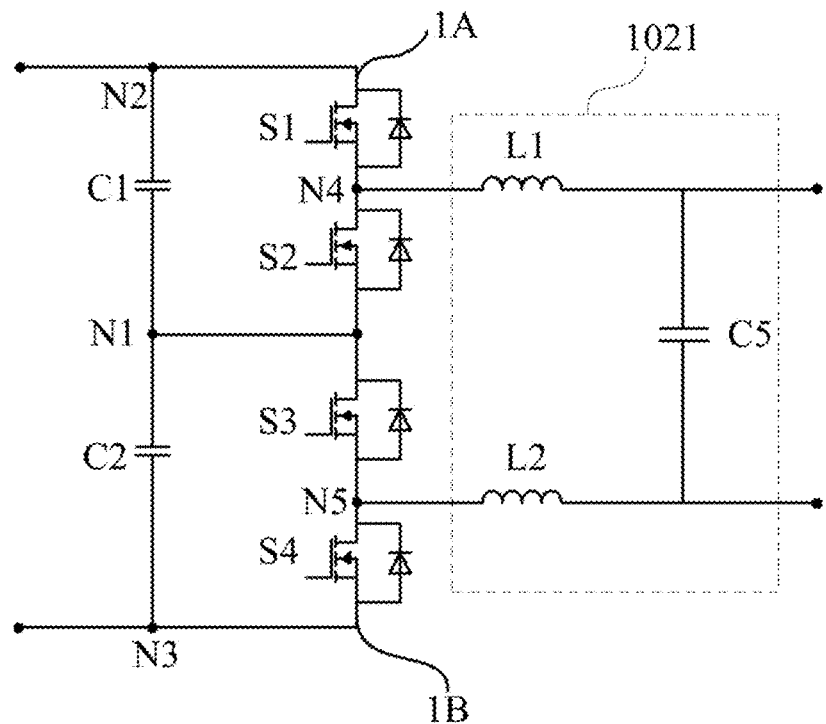
FIG. 9 is a schematic diagram of a structure of the DC/DC converter provided by the present disclosure.

FIG. 9 is a schematic diagram of a structure of the DC/DC converter provided by the present disclosure. In the embodiment shown in FIG. 9, the first passive network 102 only includes a second passive network 1021, and the second passive network 1021 includes a first inductor L1, a second inductor L2, and a fifth capacitor C5. A first terminal of the first inductor L1 is connected to the fourth node N4, a first terminal of the second inductor L2 is connected to the fifth node N5, a second terminal of the first inductor L1 and a second terminal of the second inductor L2 are connected to different nodes of the switching circuit 104. The fifth capacitor C5 is coupled between the second passive network 1021 and the second switching circuit 104. It should be noted that the DC/DC converter in the embodiment shown in FIG. 9 is a non-isolated DC/DC converter.

Figure 10:
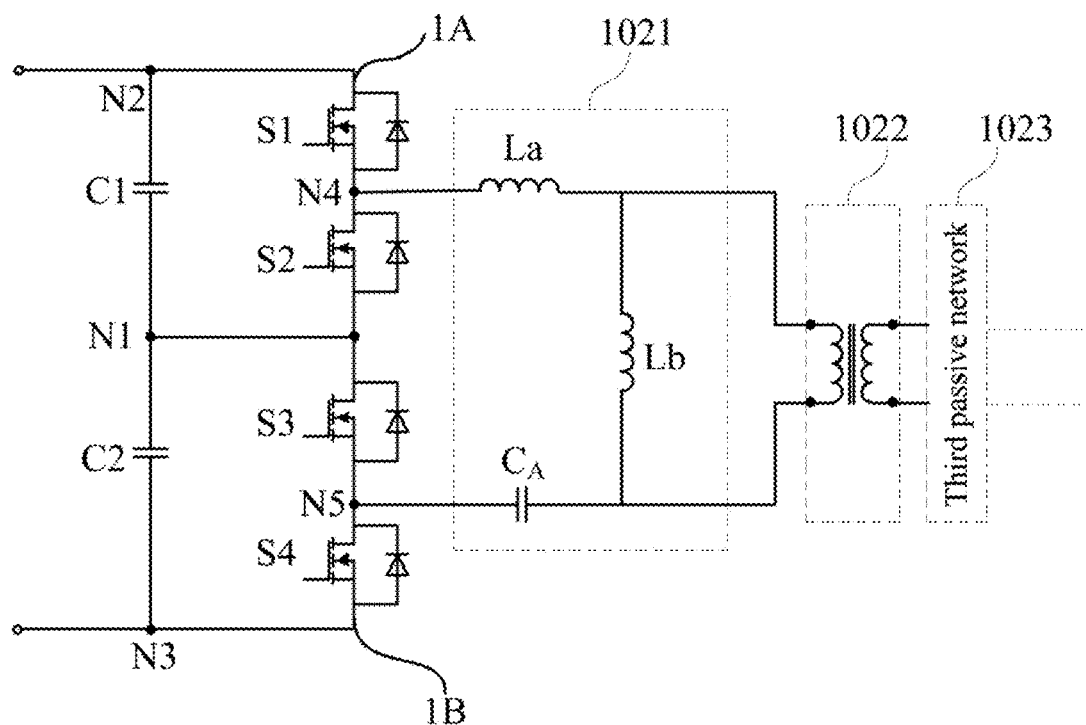
FIG. 10 is a schematic diagram of another structure of the DC/DC converter provided by the present disclosure.

FIG. 10 is a schematic diagram of another structure of the DC/DC converter provided by the present disclosure. In the embodiment shown in FIG. 10, the first passive network 102 includes a second passive network 1021, a transformer 1022 and a third passive network 1023, where the second passive network 1021 includes: resonant inductors La and Lb, and a resonant capacitor $C_A$. A first terminal of the resonant inductor La is connected to the fourth node N4, a second terminal of the resonant inductor La is connected to one end of the primary winding of the transformer 1022, that is, the resonant inductor La is connected to a sixth node N6; a first terminal of the resonant capacitor $C_A$ is connected to the fifth node N5, and a second terminal of the resonant capacitor $C_A$ is connected to the other end of the primary winding of the transformer 1022, that is, the second terminal of the resonant capacitor $C_A$ is connected to a seventh node N7; a first terminal of the resonant inductor Lb is connected to the second terminal of the resonant inductor La, and a second terminal of the resonant inductor Lb⁻ is connected to the second terminal of the resonant capacitor $C_A$.

Figure 11:
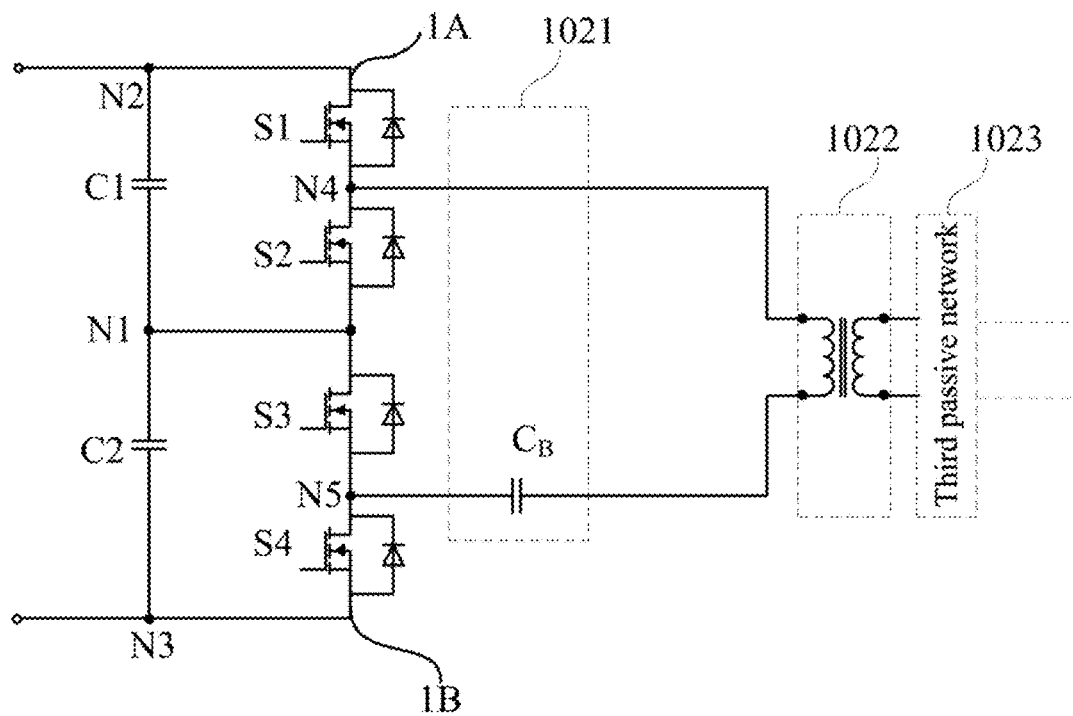
FIG. 11 is a schematic diagram of another structure of the DC/DC converter provided by the present disclosure.

FIG. 11 is a schematic diagram of another structure of the DC/DC converter provided by the present disclosure. In the embodiment shown in FIG. 11, the first passive network 102 includes a second passive network 1021, a transformer 1022, and a third passive network 1023.

The second passive network 1021 only includes a capacitor $C_B$, where the capacitor $C_B$ and the excitation inductance and leakage inductance of the transformer 1022 form a resonance network.

Among them, the DC/DC converters in the embodiments shown in FIG. 10 and FIG. 11 are all isolated DC/DC converters.

On the basis of the embodiments shown in FIG. 9 to FIG. 11, no matter what structure the second switching circuit 104 is, the control method provided in the embodiments of the present disclosure can be applied to control the neutral-point voltage balance of the series dual half-bridge structure using the 3-level circuit. In addition, referring to the embodiments shown in FIG. 9 to FIG. 11, the control method provided by the present disclosure can be applied to isolated and non-isolated DC/DC converters, and the solution has wide applicability.

It should be noted that in the foregoing embodiment, the third passive network 1023 may adopt the same structure as the second passive network 1021, or the third passive network 1023 may also adopt a structure different from the second passive network 1021. The specific structure of the third passive network 1023 is not limited in the embodiment of the present disclosure.

Figure 12:
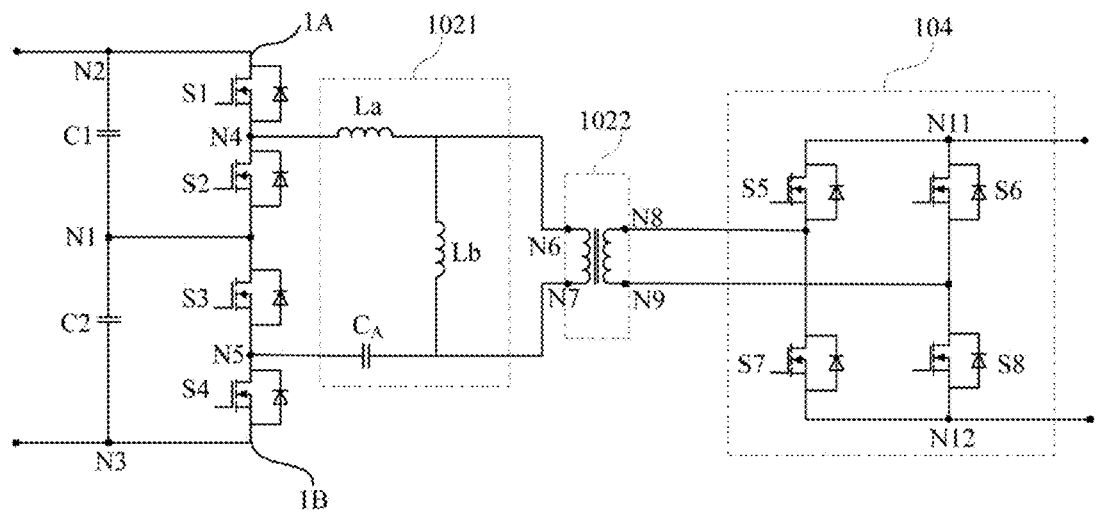
FIG. 12 is a schematic diagram of a circuit structure of a second switching circuit provided by the present disclosure.

The second switching circuit of the DC/DC converter provided in the present disclosure may be a full-bridge rectifier circuit, or may also be a full-wave rectifier circuit, or may also be a circuit with an SHB structure. The second switching circuit is described in detail below:

FIG. 12 is a schematic diagram of a circuit structure of the second switching circuit provided by the present disclosure. Referring to FIG. 12, the second switching circuit 104 may be a full-bridge rectifier circuit, and the second switching circuit 104 includes:

a fourth bridge arm 2A, including a fifth switch S5 and a seventh switch S7 coupled to an eighth node N8; and a fifth bridge arm 2B, including a sixth switch S6 and an eighth switch S8 coupled to a ninth node N9.

The fifth switch S5 and the sixth switch S6 are coupled to an eleventh node N11, the seventh switch S7 and the eighth switch S8 are coupled to a twelfth node N12, and the second switching circuit 104 is electrically connected to the secondary winding of the transformer 1022 through the eighth node N8 and the ninth node N9.

In some embodiments, the second switching circuit 104 may be directly coupled to the eighth node N8 and the ninth node N9 of the secondary winding of the transformer 1022, or the second switching circuit 104 may also be electrically connected to the secondary winding of the transformer 1022 through the third passive network 1023.

The circuit form of the third passive network 1023 may be the same as or different from the second passive network 1021, which is not particularly limited in the present disclosure. In the embodiment shown in FIG. 12, the first switching circuit 101 is a series dual half-bridge circuit (SHB circuit), the output ports of the two bridge arms 1A and 1B of the first switching circuit 101 are connected to the primary winding of the transformer 1022 through the second passive network 1021 (and the structure of the second passive network 1021 is not limited to that shown in FIG. 12), the second switching circuit 104 is a full-bridge rectifier circuit. For the first switching circuit 101, the neutral-point voltage balance of the first switching circuit 101 can be adjusted with the control method shown in the above-mentioned embodiment based on the selected desired operating states of the respective switches in the 1-level state within a switching period so that the DC/DC converter has a completely symmetrical operating mode in the positive and negative half periods, and the positive and negative half periods have the same effect on the neutral-point voltage, and stronger regulation ability can be obtained; in addition, the bridge arms of the DC/DC converter are symmetrical in current, which facilitates the realization of ZVS of the switches; at the same time, the stress and loss of the four switches of the first bridge arm 1A and the second bridge arm 1B can be made uniform, and the energy efficiency is improved.

Figure 13:
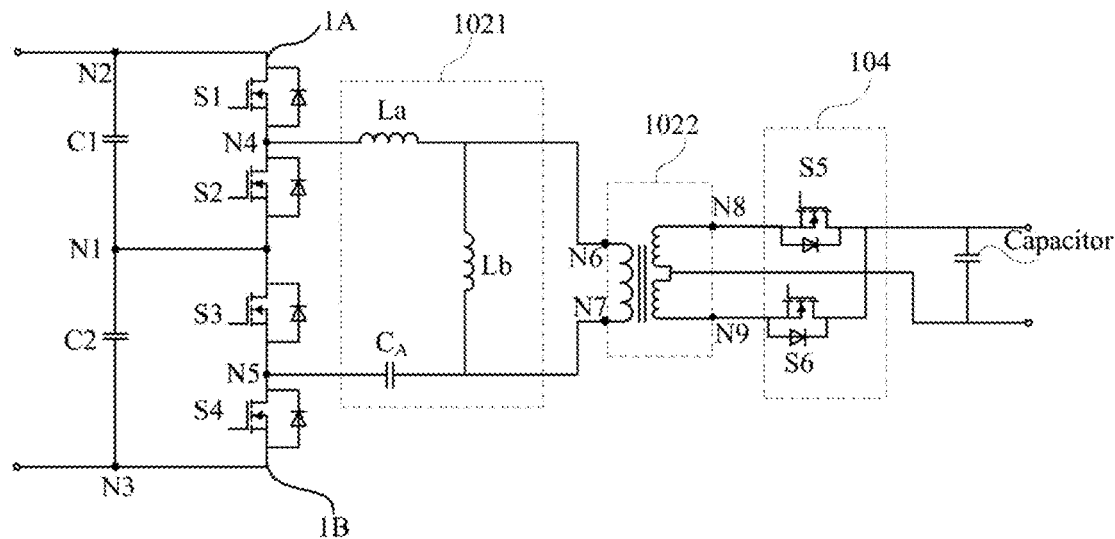
FIG. 13 is a schematic diagram of another circuit structure of the second switching circuit provided by the present disclosure.

FIG. 13 is a schematic diagram of another circuit structure of the second switching circuit 104. As is shown in FIG. 13, the second switching circuit 104 may be a full-wave rectifier circuit, and the second switching circuit 104 includes:

a fifth switch S5 having its first terminal electrically connected to the eighth node N8 of the secondary winding of the transformer 1022 through; and a sixth switch S6 having its first terminal electrically connected to the ninth node N9 of the secondary winding of the transformer 1022 and its second terminal coupled to the second terminal of the fifth switch S5.

In the case shown in FIG. 13, a capacitor can also be coupled between a third terminal of the secondary winding of the transformer 1022 and the second terminal of the sixth switch S6.

In the embodiment shown in FIG. 13, the first switching circuit 101 is a series dual half-bridge circuit, the output ports of the two bridge arms 1A and 1B of the first switching circuit 101 are connected to the primary winding of the transformer 1022 through the second passive network 1021 (where the structure of the second passive network is not limited to that shown in FIG. 13), the second switching circuit 104 is a full-wave rectifier circuit.

For the first switching circuit 101, the neutral-point voltage balance of the first switching circuit 101 can be adjusted with the control method shown in the above-mentioned embodiment based on the selected desired operating states of the switches in the 1-level state within a switching period so that the DC/DC converter has a completely symmetrical operating mode in the positive and negative half periods, and the positive and negative half periods has the same effect on the neutral-point voltage, and stronger regulation ability can be obtained. In addition, the bridge arms of the DC/DC converter are symmetrical in current, which facilitates the realization of ZVS of the switches; at the same time, the stress and loss of the four switches of the first bridge arm 1A and the second bridge arm 1B can be made uniform, and the energy efficiency is improved. In this embodiment, when the second switching circuit 104 is the rectifier circuit shown above, uncontrolled rectification or synchronous rectification or other modulation methods can be used for the second switching circuit 104, which are not particularly limited in the present disclosure.

Figure 14:
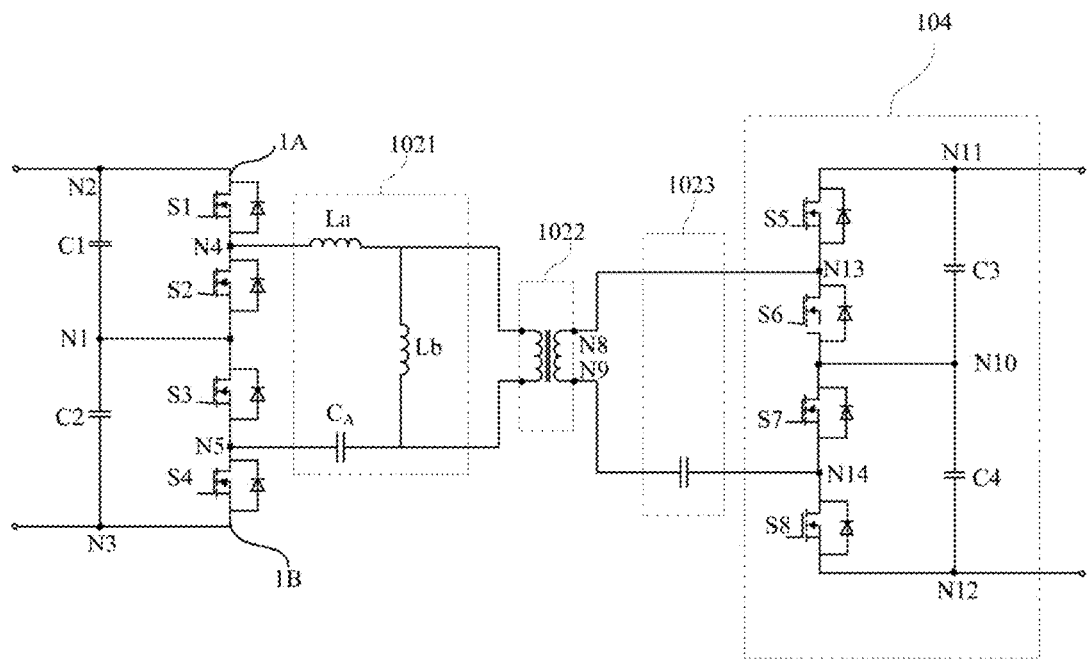
FIG. 14 is a schematic diagram of still another circuit structure of the second switching circuit provided by the present disclosure.

FIG. 14 is a schematic diagram of still another circuit structure of the second switching circuit 104. As is shown in FIG. 14, in an embodiment, the second switching circuit 104 may also have a series dual half-bridge (SHB) structure. The second switching circuit 104 includes:

a third capacitor C3 and a fourth capacitor C4 coupled to a tenth node N10, where a second terminal of the third capacitor C3 is coupled to an eleventh node N11, and a second terminal of the fourth capacitor C4 is coupled to a twelfth node N12.

The second switching circuit 104 further includes:

a third bridge arm 2A coupled between the tenth node N10 and the eleventh node N11 and a fourth bridge arm 2B coupled between the twelfth node N12 and the tenth node N10. Where the third bridge arm 2A includes a fifth switch S5 and a sixth switch S6 coupled to the thirteenth node N13, and the fourth bridge arm 2B includes a seventh switch S7 and an eighth switch S8 coupled to the fourteenth node N14, and the second switching circuit 104 is electrically connected to the secondary winding of the transformer 1022 through the thirteenth node N13 and the fourteenth node N14.

In the embodiment shown in FIG. 14, the control method may further include:

outputting a fifth control signal, a sixth control signal, a seventh control signal and an eighth control signal to control terminals of the fifth switch S5, the sixth switch S6, the seventh switch S7 and the eighth switch S8. Where the fifth control signal, the sixth control signal, the seventh control signal and the eighth control signal are all a square wave signal with a preset period, the fifth control signal is complementary to the sixth control signal, and the seventh control signal is complementary to the eighth control signal.

In a 1-level state, respective corresponding desired operating states of the switches in the second switching circuit 104 may include the following two modes: a corresponding desired operating state of the fifth switch S5 and the seventh switch S7 is an ON state; and 2) a corresponding desired operating state of the sixth switch S6 and the eighth switch S8 is an ON state.

When the control of the neutral-point voltage balance is performed, the voltage difference between the third capacitor C3 and the fourth capacitor C4 is reduced by selecting the desired operating states of the switches in the second switching circuit 104 at 1 level within one switching period.

The reduction in the voltage difference between the third capacitor C3 and the fourth capacitor C4 can be achieved in the following manner:

detecting a third voltage across the third capacitor C3 and a fourth voltage across the fourth capacitor C4; and if an absolute value of the difference between the third voltage and the fourth voltage is greater than or equal to a preset value, selecting the respective corresponding desired operating states of the switches in the second switching circuit 104 at the 1-level state according to the difference between the third voltage and the fourth voltage and the direction of the average current from the thirteenth node N13 to the first passive network, where the preset value is greater than or equal to zero.

Specifically, if an absolute value of the difference between the third voltage and the fourth voltage is greater than or equal to a preset value, the respective corresponding desired operating states of the switches in the second switching circuit 104 is selected at the 1-level state.

Further, according to the selected respective corresponding desired operating states of the switches in the second switching circuit 104 at the 1-level state, a fifth control signal, a sixth control signal, a seventh control signal and an eighth control signal are respectively output to the fifth switch S5, the sixth switch S6, the seventh switch S7 and the eighth switch S8 to enable the difference between the third voltage and the fourth voltage to be reduced.

That is to say, when the second switching circuit is of the SHB structure, the control method for the first switching circuit in the above embodiment can be used to adjust the neutral-point voltage balance of the second switching circuit. For specific applications, please refer to the detailed description in the above-mentioned embodiments, and the disclosure will not be repeated here.

Figure 15:
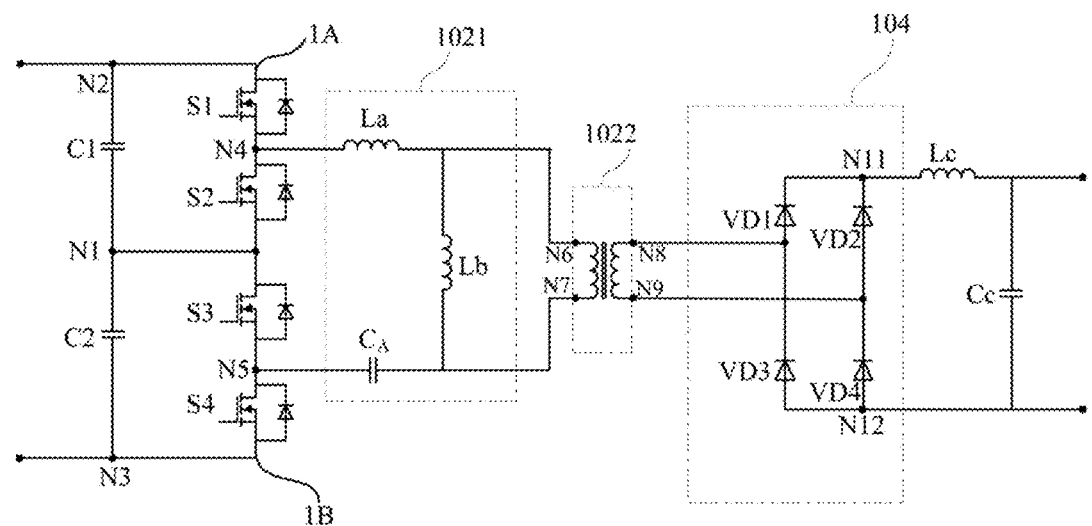
FIG. 15 is a schematic diagram of yet another circuit structure of the second switching circuit provided by the present disclosure.

In practical applications, the neutral-point voltage balance of the second switching circuit can also be controlled by a control module 103. The structure of the control module 103 may be as shown in the embodiment of FIG. 15, and may include a detecting unit 1051, a unit for determining the operating states of the switches 1052, and a control signal outputting unit 1053.

Although the embodiment of the present disclosure is described with an example where the source is coupled to the second node N2 and the third node N3, in other embodiments, the source may also be coupled to the second switching circuit, that is, the circuit may operate in a forward or reverse direction, or the circuit may operate in two directions, which is not particularly limited in the present disclosure.

The structure of the first passive network of the DC/DC converter using the 3-level circuit and the structure of the second switching circuit are only examples. The above examples can be used in any combination, and other structures can also be included in other embodiments. As long as the first switching circuit 101 uses the 3-level circuit of the SHB structure, the control method provided in the present disclosure can be used to adjust the neutral-point voltage.

In summary, in the embodiments of the present disclosure, the neutral-point voltage balance of the DC/DC converter can be effectively adjusted by means of controlling complementary conduction of the first switch, the second switch, complementary conduction of the third switch and the fourth switch of the DC/DC converter with the SHB structure, during controlling of the neutral-point voltage balance, selecting respective corresponding desired operating states of the switches in the first switching circuit at the 1-level state within a switching period according to the difference between the first voltage and the second voltage and the direction of the average current from the fourth node to the first passive network in the 1-level state, and outputting corresponding control signals according to the selected respective corresponding desired operating states of the switches in the 1-level state to enable the voltage difference between the first capacitor and the second capacitor to be reduced. In this control method, since the positive and negative half periods have a completely symmetrical operating mode and the same effect on the neutral-point voltage, the switches in the SHB structure have the same conduction duration. Compared with the traditional control method of neutral-point voltage adjustment, the method of the embodiment of the present disclosure has a higher neutral-point voltage adjustment ability, which is beneficial for all four switches in the bridge arms to realize ZVS, at the same time, the stress and loss of the four switches are made uniform, and the energy efficiency is improved.

FIG. 15 is a schematic diagram of yet another circuit structure of the second switching circuit 104. As is shown in FIG. 15, in one embodiment, the second switching circuit 104 includes:

a first diode VD1 coupled to an eighth node N8 and an eleventh node N11, a second diode VD2 coupled to a ninth node N9 and the eleventh node N11, a third diode VD3 coupled to the eighth node N8 and a twelfth node N12, and a fourth diode VD4 coupled to the ninth node N9 and the twelfth node N12, where the directions of the first to fourth diodes are respectively shown in FIG. 15.

A network composed of an inductor and a capacitor in series connection can also be coupled between the eleventh node N11 and the twelfth node N12.

In the embodiment shown in FIG. 15, the first switching circuit 101 is a series dual half-bridge circuit, the output ports of the two bridge arms 1A and 1B of the first switching circuit 101 are connected to the primary winding of the transformer 1022 through the second passive network 1021, where the structure of the second passive network is not limited to that shown in FIG. 15, and the second switching circuit 104 is a bridge rectifier circuit composed of four diodes.

For the first switching circuit 101, the neutral-point voltage balance of the first switching circuit 101 can be adjusted with the control method shown in the above-mentioned embodiment based on the selected desired operating states of the switches in the 1-level state within a switching period so that the DC/DC converter has a completely symmetrical operating mode in the positive and negative half control periods, the positive and negative half periods have the same effect on the neutral-point voltage, and stronger regulation ability can be obtained. In addition, the bridge arms of the DC/DC converter are symmetrical in current, which facilitates the realization of ZVS of the switches. At the same time, the stress and loss of the four switches of the first bridge arm 1A and the second bridge arm 1B can be made uniform, and energy efficiency is improved.

On the basis of the above-described embodiments, it is also possible to switch the modulation mode among the three modulation modes of 0/1 2-level modulation, 1/2 2-level modulation, and 0/1/2 3-level modulation according to the gain range of the DC/DC converter. That is to say, the control of the neutral-point voltage balance can be performed through a combination of multiple modulation modes from the above-mentioned 0/1 2-level modulation, 1/2 2-level modulation and 0/1/2 3-level modulation. For example, for the circuit shown in FIG. 9, when the duty cycle is less than 0.5, the neutral-point voltage balance of the first switching circuit can be realized according to the 0/1 2-level modulation mode; when the duty cycle is greater than 0.5, the neutral-point voltage balance of the first switching circuit can be realized according to the 1/2 2-level modulation mode.

In combination with the above embodiments, it can be seen that, in the solution provided by the present disclosure, the DC/DC converter has a completely symmetrical operating mode in the positive and negative half periods, the positive and negative half periods have the same effect on the neutral-point voltage, and stronger regulation ability can be obtained. In addition, the bridge arms of the DC/DC converter are symmetrical in current, which facilitates the realization of ZVS of the switches; at the same time, the stress and loss of the four switches of the first bridge arm 1A and the second bridge arm 1B can be made uniform, and energy efficiency is improved. In addition, the solution of the present disclosure can be applied to various types of resonant or non-resonant, unidirectional or bidirectional DC/DC conversion circuits, isolated or non-isolated DC/DC converters using the series dual half-bridge 3-level structure as the input terminal. It has wide applicability.

It should be noted that although several modules or units of the device for action execution are mentioned in the above detailed description, such division is not mandatory. In fact, according to the embodiments of the present disclosure, the features and functions of two or more modules or units described above may be embodied in one module or unit. Conversely, the features and functions of a module or unit described above may be embodied in multiple further divided modules or units. In addition, the above-mentioned drawings are merely schematic illustrations of the processes included in the method according to the exemplary embodiment of the present disclosure, and are not intended for limitation. It is easy to understand that the processes shown in the above drawings does not indicate or limit the time sequence of these processes. In addition, it is also easy to understand that these processes can be executed, for example, synchronously or asynchronously in multiple modules. Those skilled in the art will easily think of other embodiments of the present disclosure after considering the specification and practicing the present disclosure disclosed herein. The present disclosure is intended to cover any variations, uses, or adaptive changes of the present disclosure, while these variations, uses, or adaptive changes follow the general principles of the present disclosure and include common knowledge or conventional technical means in the technical field not disclosed in the present disclosure. The description and the embodiments are only regarded as exemplary, and the true scope and concept of the present disclosure are subject to the claims.

What is claimed is:

1. A control method of a Direct Current/Direct Current (DC/DC) converter applied to the DC/DC converter, wherein the DC/DC converter comprises a first switching circuit, the first switching circuit comprises a first capacitor and a second capacitor coupled to a first node, a second terminal of the first capacitor is coupled to a second node, and a second terminal of the second capacitor is coupled to a third node; the first switching circuit further comprises a first bridge arm coupled between the first node and the second node, and a second bridge arm coupled between the first node and the third node; the first bridge arm comprises a first switch and a second switch coupled to a fourth node, and the second bridge arm comprises a third switch and a fourth switch coupled to a fifth node; and the DC/DC converter further comprises a first passive network electrically connected to the fourth node and the fifth node;

wherein the method comprises:
outputting a first control signal, a second control signal, a third control signal and a fourth control signal to control terminals of the first switch, the second switch, the third switch and the fourth switch respectively, wherein the first control signal, the second control signal, the third control signal and the fourth control signal are all a square wave signal with a preset period, the first control signal is complementary to the second control signal, and the third control signal is complementary to the fourth control signal, respective corresponding desired operating states of the switches in a 1-level state comprise: 1) a corresponding desired operating state of the first switch and the third switch is an ON state; and 2) a corresponding desired operating state of the second switch and the fourth switch is an ON state;
detecting a first voltage across the first capacitor and a second voltage across the second capacitor; and
selecting, according to a difference between the first voltage and the second voltage and a direction of an average current from the fourth node to the first passive network in the 1-level state, the respective corresponding desired operating states of the switches in the 1-level state to enable the voltage difference between the first capacitor and the second capacitor to be reduced.

2. The method according to claim 1, wherein the DC/DC converter is a bidirectional DC/DC converter.

3. The method according to claim 1, wherein the first switching circuit has a modulation mode comprising: any one or a combination of 0/1 2-level modulation, 1/2 2-level modulation, or 0/1/2 3-level modulation.

4. The method according to claim 1, the first passive network further comprises a transformer, and the DC/DC converter further comprises a second switching circuit electrically connected to a secondary winding of the transformer, the second switching circuit comprises a third capacitor and a fourth capacitor coupled to a tenth node, a second terminal of the third capacitor is coupled to an eleventh node, and a second terminal of the fourth capacitor is coupled to a twelfth node; and the second switching circuit further comprises a third bridge arm coupled between the eleventh node and the tenth node and a fourth bridge arm coupled between the twelfth node and the tenth node, the third bridge arm comprises a fifth switch and a sixth switch coupled to a thirteenth node, and the fourth bridge arm comprises a seventh switch and an eighth switch coupled to a fourteenth node, and the secondary winding is electrically connected to the thirteenth node and the fourteenth node.

5. The method according to claim 4, further comprising:
outputting a fifth control signal, a sixth control signal, a seventh control signal and an eighth control signal to control terminals of the fifth switch, the sixth switch, the seventh switch and the eighth switch, wherein the fifth control signal, the sixth control signal, the seventh control signal and the eighth control signal are all a square wave signal with a preset period, the fifth control signal is complementary to the sixth control signal, and the seventh control signal is complementary to the eighth control signal; respective corresponding desired operating states of the switches in the 1-level state comprise: 1) a corresponding desired operating state of the fifth switch and the seventh switch is an ON state; and 2) a corresponding desired operating state of the sixth switch and the eighth switch is an ON state;
detecting a third voltage across the third capacitor and a fourth voltage across the fourth capacitor; and
selecting, according to a difference between the third voltage and the fourth voltage and a direction of a current on the secondary winding in the 1-level state, the corresponding desired operating state of the switches in the 1-level state to enable the voltage difference between the third capacitor and the fourth capacitor to be reduced.

6. The method according to claim 1, wherein the selecting, according to the difference between the first voltage and the second voltage and the direction of the average current from the fourth node to the first passive network in the 1-level state, the respective corresponding desired operating states of the switches in the 1-level state to enable the voltage difference between the first capacitor and the second capacitor to be reduced comprises:
if an absolute value of the difference between the first voltage and the second voltage is greater than or equal to a preset value, selecting the respective corresponding desired operating states of the switches in the 1-level state to enable the voltage difference between the first capacitor and the second capacitor to be reduced, wherein the preset value is greater than or equal to zero.

7. The method according to claim 6, wherein the selecting, according to the difference between the first voltage and the second voltage and the direction of the average current from the fourth node to the first passive network in the 1-level state, the respective corresponding desired operating states of the switches in the 1-level state comprises:

if the difference between the first voltage and the second voltage is a positive value and the direction of the average current from the fourth node to the first passive network in the 1-level state is a positive direction, selecting the corresponding desired operating state of the first switch and the third switch in the 1-level state to be an ON state and the corresponding desired operating state of the second switch and the fourth switch to be an OFF state.

8. The method according to claim 6, wherein the selecting, according to the difference between the first voltage and the second voltage and the direction of the average current from the fourth node to the first passive network in the 1-level state, the respective corresponding desired operating states of the switches in the 1-level state comprises:

if the difference between the first voltage and the second voltage is a negative value and the direction of the average current from the fourth node to the first passive network in the 1-level state is a positive direction, selecting the corresponding desired operating state of the second switch and the fourth switch in the 1-level state to be an ON state and the corresponding desired operating state of the first switch and the third switch to be an OFF state.

9. The method according to claim 6, wherein the selecting, according to the difference between the first voltage and the second voltage and the direction of the average current from the fourth node to the first passive network in the 1-level state, the respective corresponding desired operating states of the switches in the 1-level state comprises:

if the difference between the first voltage and the second voltage is a positive value and the direction of the average current from the fourth node to the first passive network in the 1-level state is a negative direction, selecting the corresponding desired operating state of the second switch and the fourth switch in the 1-level state to be an ON state and the corresponding desired operating state of the first switch and the third switch to be an OFF state.

10. The method according to claim 6, wherein the selecting, according to the difference between the first voltage and the second voltage and the direction of the average current from the fourth node to the first passive network in the 1-level state, the respective corresponding desired operating states of the switches in the 1-level state comprises:

if the difference between the first voltage and the second voltage is a negative value and the direction of the average current from the fourth node to the first passive network in the 1-level state is a negative direction, selecting the corresponding desired operating state of the first switch and the third switch in the 1-level state to be an ON state and the corresponding desired operating state of the second switch and the fourth switch to be an OFF state.

11. A Direct Current/Direct Current (DC/DC) converter, comprising: a first switching circuit that comprises a first capacitor, a second capacitor, a first bridge arm and a second bridge arm; wherein:

the first capacitor has its first terminal coupled to a first node and its second terminal coupled to a second node;

the second capacitor has its first terminal coupled to the first node and its second terminal coupled to a third node;

the first bridge arm is coupled between the first node and the second node, and comprises a first switch and a second switch coupled to a fourth node;

the second bridge arm is coupled between the first node and the third node, and comprises a third switch and a fourth switch coupled to a fifth node;

the DC/DC converter further comprises: a first passive network electrically connected to the fourth node and the fifth node;

the DC/DC converter further comprises: a control module, coupled to the first capacitor, the second capacitor, the first bridge arm and the second bridge arm, and configured to:

output a first control signal, a second control signal, a third control signal and a fourth control signal to control terminals of the first switch, the second switch, the third switch and the fourth switch, wherein the first control signal, the second control signal, the third control signal and the fourth control signal are all a square wave signal with a preset period, the first control signal is complementary to the second control signal, the third control signal is complementary to the fourth control signal, respective corresponding desired operating states of the switches in a 1-level state comprise: 1) a corresponding desired operating state of the first switch and the third switch is an ON state; and 2) a corresponding desired operating state of the second switch and the fourth switch is an ON state;

the control module comprises: a detecting unit configured to detect a first voltage across the first capacitor and a second voltage across the second capacitor;

a unit for determining the operating states of the switches, configured to determine, according to a difference between the first voltage and the second voltage and a direction of an average current from the fourth node to the first passive network in the 1-level state, the respective corresponding desired operating states of the first switch, the second switch, the third switch and the fourth switch in the 1-level state; and a control signal outputting unit, configured to output a first control signal, a second control signal, a third control signal and a fourth control signal according to the respective corresponding desired operating states of the first switch, the second switch, the third switch and the fourth switch to enable the voltage difference between the first capacitor and the second capacitor to be reduced.

12. The DC/DC converter according to claim 11, wherein the DC/DC converter is a bidirectional DC/DC converter.

13. The DC/DC converter according to claim 11, wherein the first switching circuit has a modulation mode comprising: any one or a combination of 0/1 2-level modulation, 1/2 2-level modulation, or 0/1/2 3-level modulation.

14. The DC/DC converter according to claim 11, wherein the control signal outputting unit is specifically configured to: if an absolute value of the difference between the first voltage and the second voltage is greater than or equal to a preset value, control the first control signal, the second control signal, the third control signal and the fourth control signal according to the respective corresponding desired operating states of the first switch, the second switch, the third switch and the fourth switch in the 1-level state to enable the voltage difference between the first capacitor and the second capacitor to be reduced, wherein the preset value is greater than or equal to zero.

15. The DC/DC converter according to claim 14, wherein the unit for determining the operating states of the switches is specifically configured to:
if an absolute value of the difference between the first voltage and the second voltage is greater than or equal to a preset value, select the respective corresponding desired operating states of the switches in the 1-level state to enable the voltage difference between the first capacitor and the second capacitor to be reduced, wherein the preset value is greater than or equal to zero.

16. The DC/DC converter according to claim 14, wherein the unit for determining the operating states of the switches is specifically configured to:
if the difference between the first voltage and the second voltage is a positive value and the direction of the average current from the fourth node to the first passive network in the 1-level state is a positive direction, select the corresponding desired operating state of the first switch and the third switch in the 1-level state to be an ON state and the corresponding desired operating state of the second switch and the fourth switch to be an OFF state.

17. The DC/DC converter according to claim 14, wherein the unit for determining the operating states of the switches is specifically configured to:
if the difference between the first voltage and the second voltage is a negative value and the direction of the average current from the fourth node to the first passive network in the 1-level state is a positive direction, select the corresponding desired operating state of the second switch and the fourth switch in the 1-level state to be an ON state and the corresponding desired operating state of the first switch and the third switch to be an OFF state.

18. The DC/DC converter according to claim 14, wherein the unit for determining the operating states of the switches is specifically configured to:
if the difference between the first voltage and the second voltage is a positive value and the direction of the average current from the fourth node to the first passive network in the 1-level state is a negative direction, select the corresponding desired operating state of the second switch and the fourth switch in the 1-level state to be an ON state and the corresponding desired operating state of the first switch and the third switch to be an OFF state.

19. The DC/DC converter according to claim 14, wherein the unit for determining the operating states of the switches is specifically configured to:
if the difference between the first voltage and the second voltage is a negative value and the direction of the average current from the fourth node to the first passive network in the 1-level state is a negative direction, select the corresponding desired operating state of the first switch and the third switch in the 1-level state to be an ON state and the corresponding desired operating state of the second switch and the fourth switch to be an OFF state.

20. The DC/DC converter according to claim 18, wherein the first passive network further comprises a transformer, and the DC/DC converter further comprises a second switching circuit electrically connected to a secondary winding of the transformer, the second switching circuit comprises a third capacitor and a fourth capacitor coupled to a tenth node, a second terminal of the third capacitor is coupled to an eleventh node, and a second terminal of the fourth capacitor is coupled to a twelfth node; and the second switching circuit further comprises and a third bridge arm coupled between the eleventh node and the tenth node and a fourth bridge arm coupled between the twelfth node and the tenth node, the third bridge arm comprises a fifth switch and a sixth switch coupled to the thirteenth node, and the fourth bridge arm comprises a seventh switch and an eighth switch coupled to a fourteenth node, and the secondary winding is electrically connected to the thirteenth node and the fourteenth node.

21. The DC/DC converter according to claim 20, wherein the control module is configured to output a fifth control signal, a sixth control signal, a seventh control signal and an eighth control signal to control terminals of the fifth switch, the sixth switch, the seventh switch and the eighth switch, wherein the fifth control signal, the sixth control signal, the seventh control signal and the eighth control signal are all a square wave signal with a preset period, and the fifth control signal is complementary to the sixth control signal, and the seventh control signal is complementary to the eighth control signal; respective corresponding desired operating states of the switches in the 1-level state comprise: 1) a corresponding desired operating state of the fifth switch and the seventh switch is an ON state; and 2) a corresponding desired operating state of the sixth switch and the eighth switch is an ON state;
the control module is configured to control the fifth control signal, the sixth control signal, the seventh control signal and the eighth control signal to enable the voltage difference between the third capacitor and the fourth capacitor to be reduced.

22. The DC/DC converter according to claim 21, wherein the control module is further configured to: detect a third voltage across the third capacitor and a fourth voltage across the fourth capacitor;
select, according to a difference between the third voltage and the fourth voltage and a direction of a current on the secondary winding in a 1-level state, the respective corresponding desired operating states of the switches in the 1-level state; and
control the fifth control signal, the sixth control signal, the seventh control signal and the eighth control signal according to the respective corresponding desired operating states of the switches to enable the voltage difference between the third capacitor and the fourth capacitor to be reduced.

* * * * *